(12) United States Patent
Eun et al.

(10) Patent No.: US 8,127,090 B2
(45) Date of Patent: Feb. 28, 2012

(54) INFORMATION PROCESSING METHOD, AND INFORMATION PROCESSING SYSTEM

(75) Inventors: Jongsook Eun, Tokyo (JP); Yohko Mizunashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 437 days.

(21) Appl. No.: 12/071,998

(22) Filed: Feb. 28, 2008

(65) Prior Publication Data

US 2008/0235434 A1    Sep. 25, 2008

(30) Foreign Application Priority Data

Mar. 19, 2007    (JP) .............................. 2007-070721

(51) Int. Cl.
*G06F 12/00* (2006.01)
(52) U.S. Cl. .................. 711/154; 711/156; 711/159
(58) Field of Classification Search .................. 711/154, 711/156, 159
See application file for complete search history.

(56) References Cited

U.S. PATENT DOCUMENTS

| | | | |
|---|---|---|---|
| 7,275,079 B2 | 9/2007 | Brodsky et al. | |
| 2004/0128557 A1* | 7/2004 | Sakushima et al. | 713/202 |
| 2005/0114673 A1 | 5/2005 | Raikar et al. | |

FOREIGN PATENT DOCUMENTS

| | | |
|---|---|---|
| EP | 1 507 402 | 2/2005 |
| JP | 04-245549 | 9/1992 |
| JP | 2003-320737 | 11/2003 |
| JP | 2003-323093 | 11/2003 |
| JP | 2003-323269 | 11/2003 |
| JP | 2003-323283 | 11/2003 |
| JP | 2003-323311 | 11/2003 |
| JP | 2003-333241 | 11/2003 |
| JP | 2004-127119 | 4/2004 |
| JP | 2004-246873 | 9/2004 |
| JP | 2005-174290 | 6/2005 |
| JP | 2005-174291 | 6/2005 |
| JP | 3715629 | 9/2005 |
| JP | 2006-094322 | 4/2006 |
| JP | 2006-134301 | 5/2006 |
| JP | 2006-157883 | 6/2006 |
| JP | 2006-203654 | 8/2006 |
| JP | 2006-203655 | 8/2006 |
| JP | 3842213 | 8/2006 |
| JP | 3857654 | 9/2006 |
| JP | 3865242 | 10/2006 |
| JP | 2006-323610 | 11/2006 |
| JP | 2006-338637 | 12/2006 |
| JP | 3914163 | 2/2007 |

OTHER PUBLICATIONS

European Search Report dated Aug. 14, 2008 for counterpart European Application No. 08152704.6-1228.

* cited by examiner

*Primary Examiner* — Midys Rojas

(74) *Attorney, Agent, or Firm* — Harness, Dickey & Pierce, P.L.C.

(57) ABSTRACT

A user-information managing unit controls reading of information stored in a user-information DB and a rule DB and writing of information to these databases. A customization processing unit receives a request for customizing rule information stored in the rule DB and, according to the request, customizes the rule information stored in the rule DB via the user-information managing unit.

15 Claims, 23 Drawing Sheets

FIG. 4

| | TYPE | RANGE | REDUNDANCY PERMISSION | WORD-WRAP VALUE | REQUIRED VALUE | NUMBER OF PERMISSIONS FOR SAME SETTINGS | COMBINATION | INITIAL VALUE |
|---|---|---|---|---|---|---|---|---|
| NAME | CHARACTER STRING | 1 TO 20 CHARACTERS | PERMITTED | NONE | NONE | 0 TIME (UNLIMITED) | NONE | NONAME |
| REGISTRATION NUMBER | NUMERICAL VALUE | 1 TO 50000 | PROHIBITED | NONE | NONE | 0 TIME (UNLIMITED) | NONE | NONE |
| PASSWORD | CHARACTER STRING | 1 TO 128 CHARACTERS | PERMITTED | 2-BYTE CHARACTER | ALPHANUMERIC VALUE | PERMITTED UNTIL THREE TIME | LOGIN ID | NONE |
| LOGIN ID | CHARACTER STRING | 1 TO 128 CHARACTERS | PROHIBITED | 2-BYTE CHARACTER | ALPHANUMERIC VALUE | PERMITTED UNTIL THREE TIME | PASSWORD | NONE |
| EMAIL ADDRESS | CHARACTER STRING | 1 TO 128 CHARACTERS | PROHIBITED | 2-BYTE CHARACTER | ALPHANUMERIC VALUE, @ | 0 TIME (UNLIMITED) | NONE | NONE |
| ⋮ | ⋮ | ⋮ | ⋮ | ⋮ | ⋮ | ⋮ | ⋮ | ⋮ |

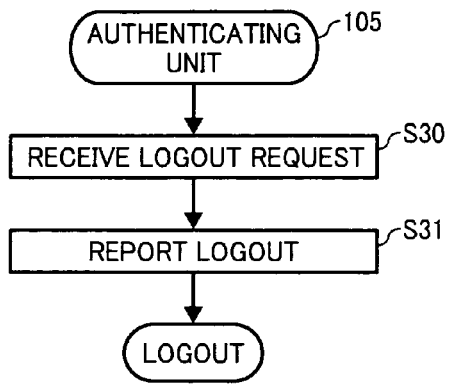
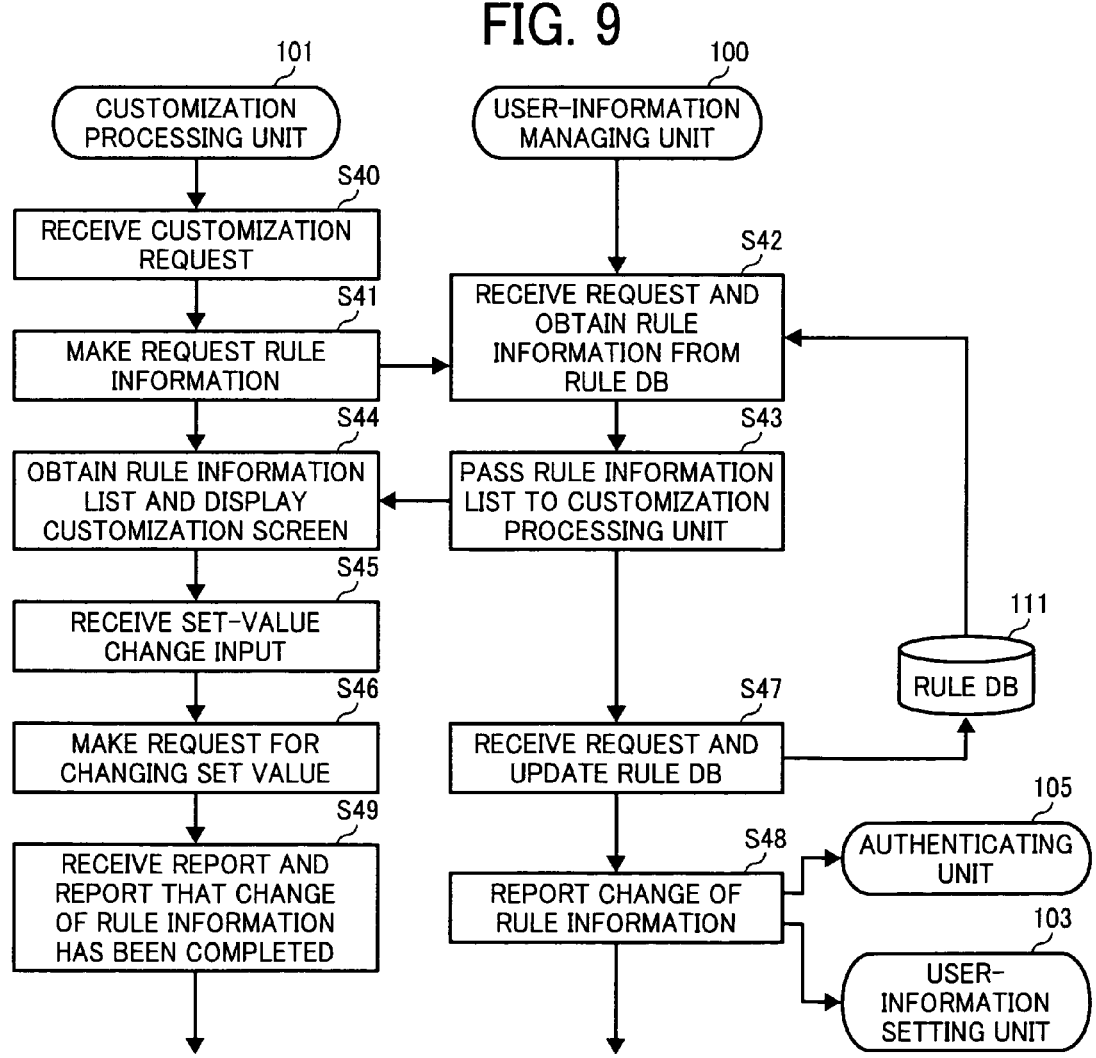

FIG. 11

| | | |
|---|---|---|
| THE FOLLOWING ITEMS ARE CUSTOMIZABLE. | | READ/WRITE |

TARGET | PASSWORD — T3 | CHANGE

RULE | RANGE | CHANGE
MINIMUM (NUMBER OF CHARACTERS) | 0 (CHARACTERS) | CHANGE
MAXIMUM (NUMBER OF CHARACTERS) | 128 (CHARACTERS) | CHANGE

ZR1

CANCEL | DETERMINE — B3

FIG. 12

|  |  | READ/WRITE |
|---|---|---|

THE FOLLOWING ITEMS ARE CUSTOMIZABLE.

TARGET | PASSWORD | T3

| TYPE | CHARACTER STRING | CHANGE |
|---|---|---|
| RANGE | 1 TO 128 CHARACTERS | CHANGE |
| REDUNDANCY PERMISSION | PERMITTED | CHANGE |
| WORD-WRAP VALUE | 2-BYTE CHARACTER | CHANGE |
| REQUIRED VALUE | ALPHANUMERIC | CHANGE |
| NUMBER OF PERMISSIONS FOR SAME SETTINGS | PERMITTED UNTIL THREE TIMES | CHANGE |
| COMBINATION | LOGIN ID | CHANGE |
| INITIAL VALUE | NONE | CHANGE |
| XX EMAIL | XXX | CHANGE |

ZR2

B5

CANCEL | DETERMINE

FIG. 13

THE FOLLOWING ITEMS ARE CUSTOMIZABLE.

READ/WRITE

RULE  TYPE  (Z1)

|  | NAME (T1) | REGISTRATION NUMBER (T2) | PASSWORD (T3) | ... | XX INFORMATION |
|---|---|---|---|---|---|
| A1 CHARACTER STRING (STRING) | ✓ |  | ✓ |  |  |
| A2 TWO ALTERNATIVES (TRUE/FALSE) |  |  |  |  |  |
| A3 NUMERICAL VALUE (BYTE) |  |  |  |  |  |
| A4 NUMERICAL VALUE (SHORT) |  |  |  |  |  |
| A5 NUMERICAL VALUE (INTEGER) |  |  |  |  |  |
| A6 NUMERICAL VALUE (LONG) |  | ✓ |  |  |  |
| A7 DATE (DATE) |  |  |  | ... |  |
| A8 ALTERNATIVE (ENUM) |  |  |  |  |  |
| A9 BINARY |  |  |  |  |  |
| A10 IP ADDRESS (V4) |  |  |  |  |  |
| A11 IP ADDRESS (V6) |  |  |  |  |  |
| A12 BAR CODE |  |  |  |  |  |
| ... |  |  |  |  |  |
| XX TYPE |  |  |  | ... | ✓ |

CANCEL    DETERMINE (B7)

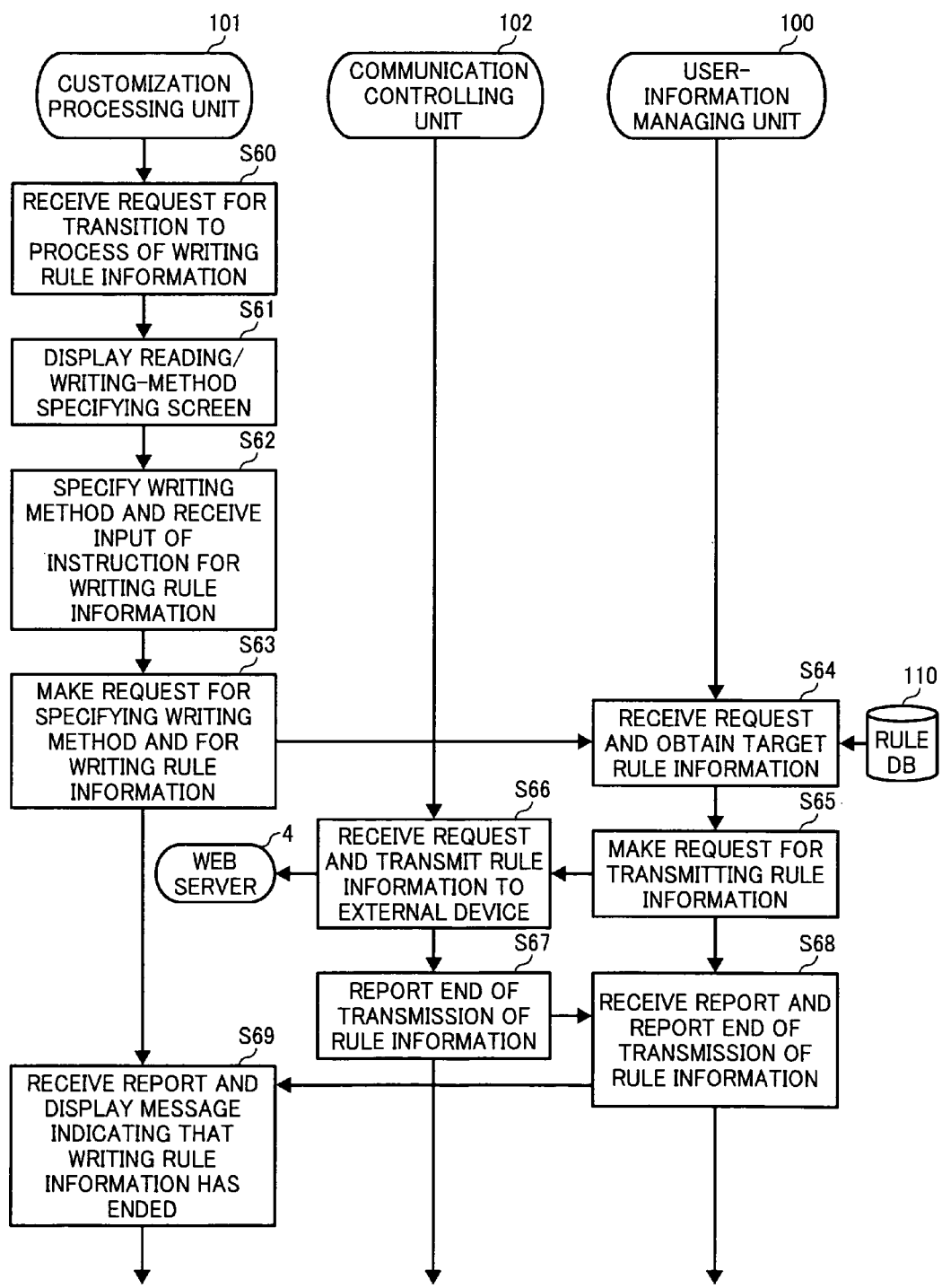

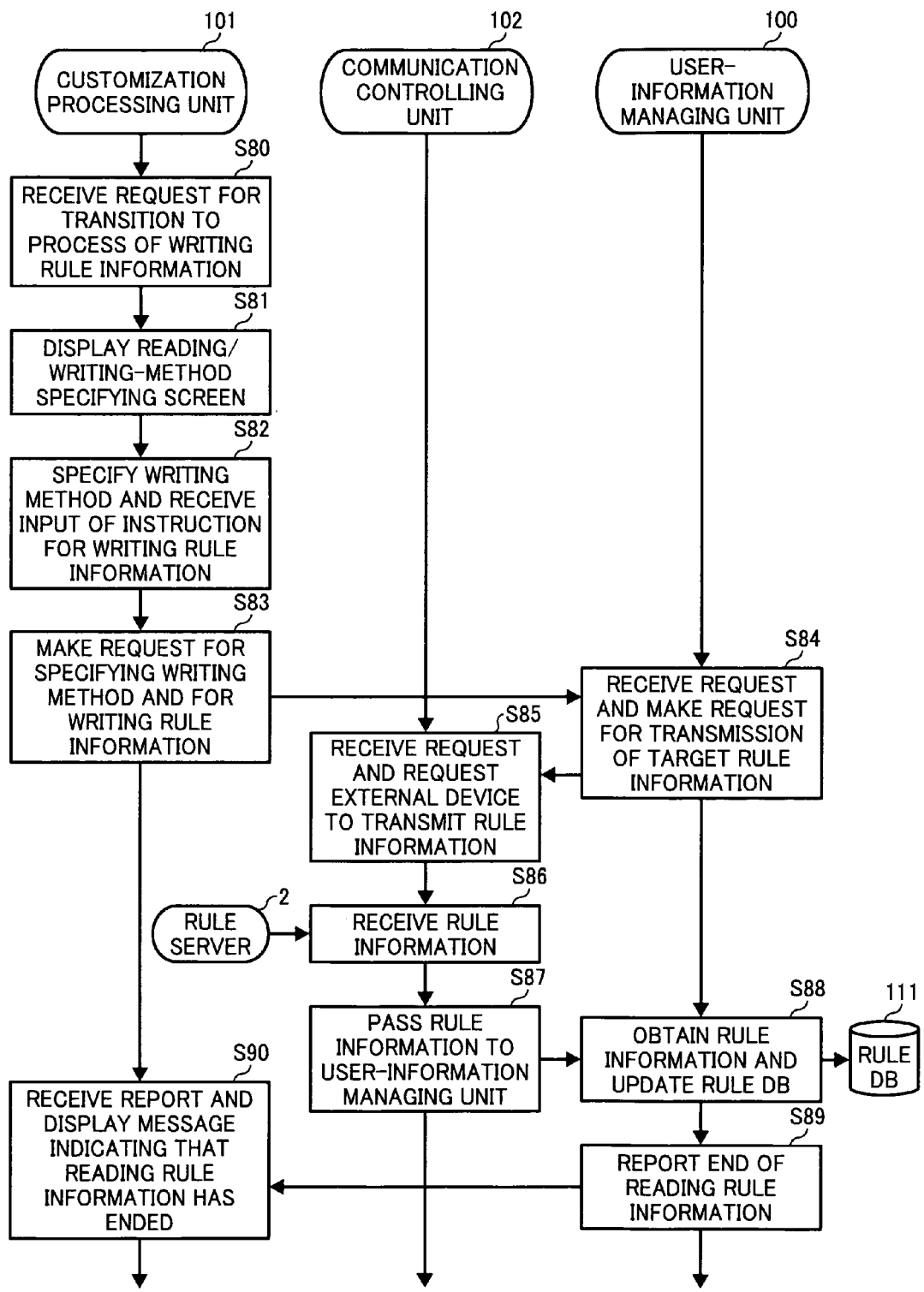

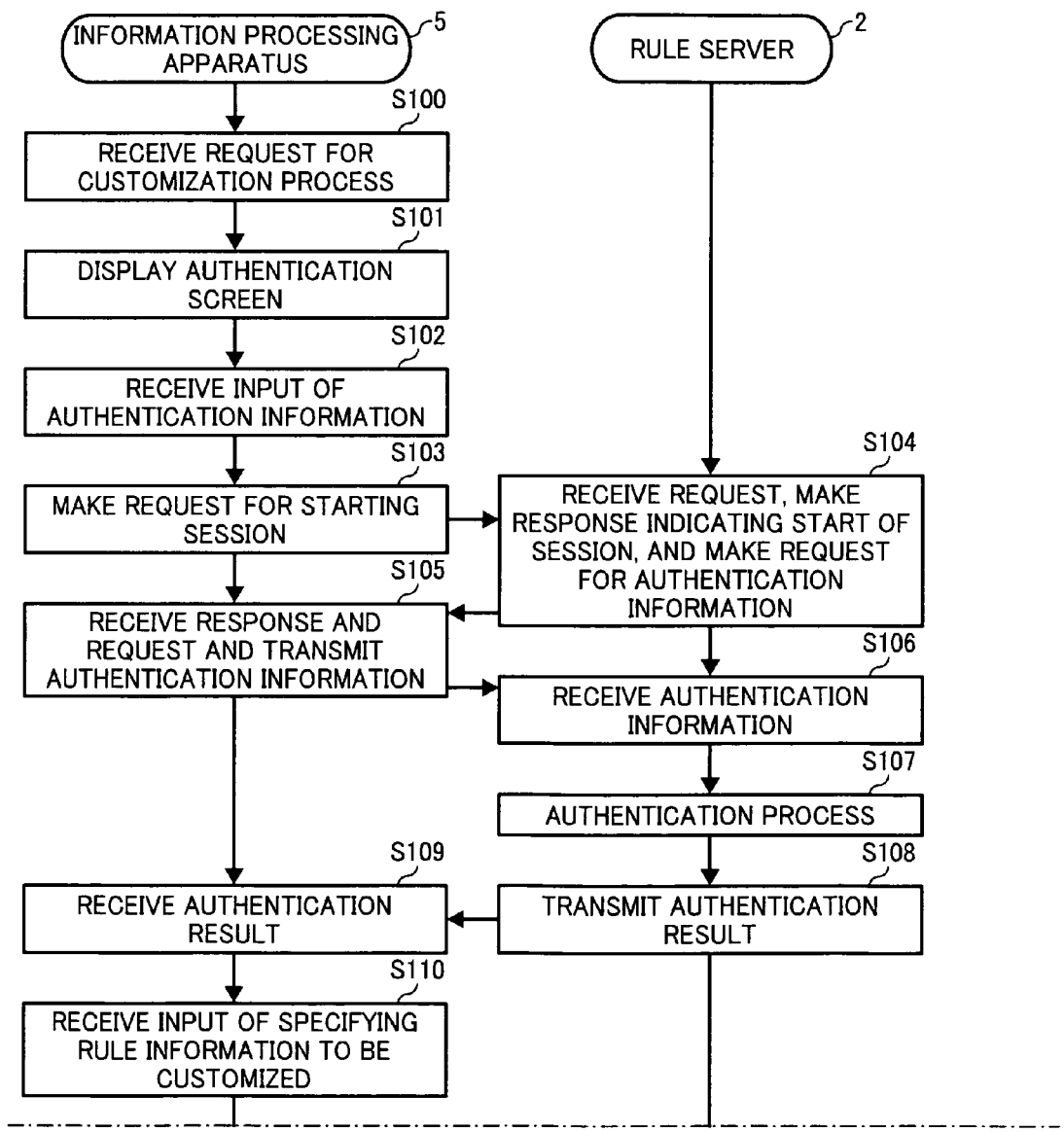

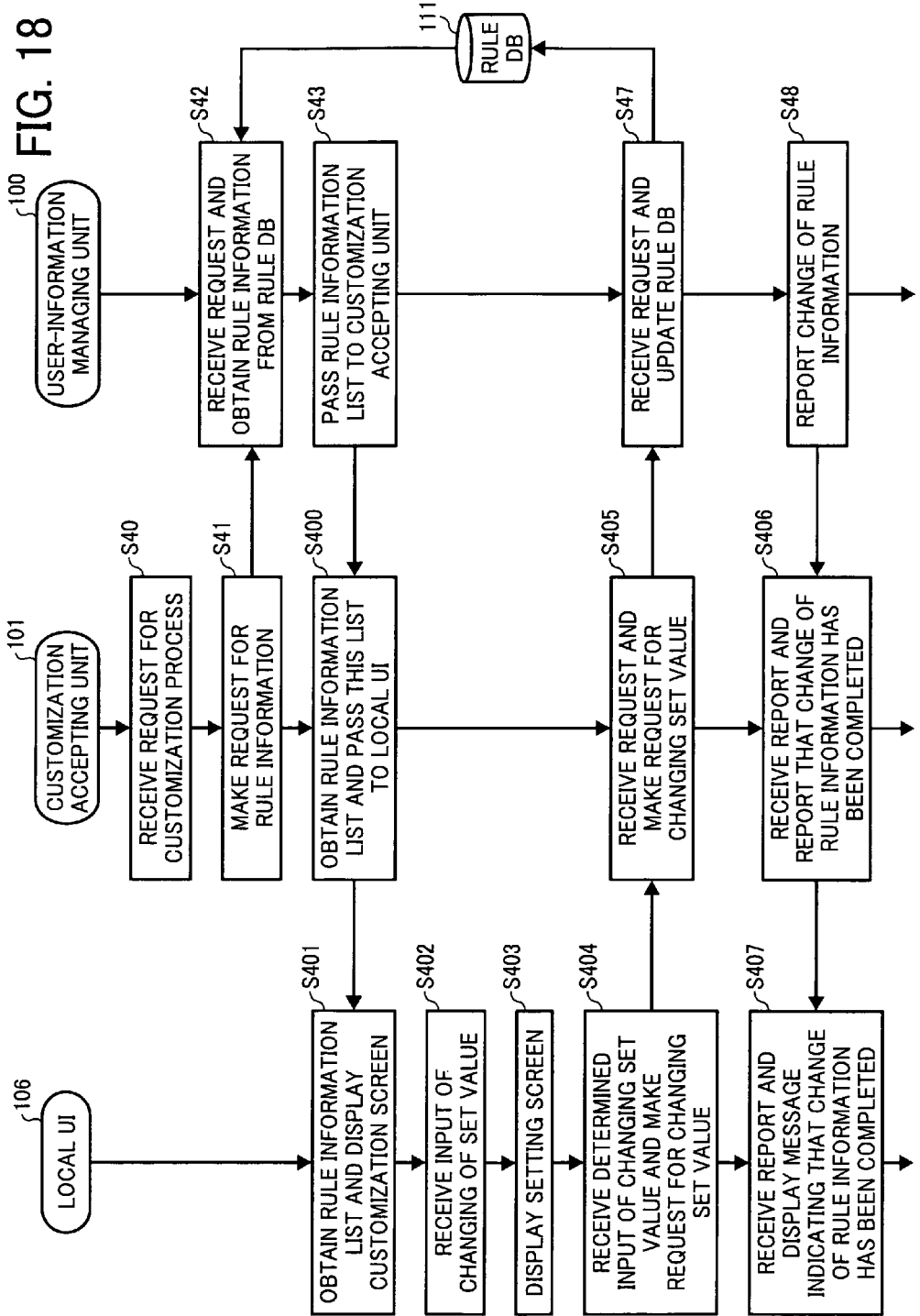

INFORMATION PROCESSING METHOD, AND INFORMATION PROCESSING SYSTEM

CROSS-REFERENCE TO RELATED APPLICATIONS

The present application claims priority to and incorporates by reference the entire contents of Japanese priority document 2007-070721 filed in Japan on Mar. 19, 2007.

BACKGROUND OF THE INVENTION

1. Field of the Invention

The present invention relates to technology for changing specifications of user information.

2. Description of the Related Art

Some information processing apparatuses typified by image forming apparatuses retain user information, such as an email address and a login identification (ID) (for example, refer to Japanese Patent Application Laid-open No. 2003-323283). However, user information that is in predefined specifications, such as data type, data size, enterable character type, can only be retained in such information processing apparatuses.

However, different environments where user information is used may have different desirable specifications. For example, a desirable data size of a login ID may be 32 bytes under an environment with a small number of users, whilst 64 bytes may be desired under an environment with a large number of users. Also, for example, some environments retain one mail addresses for one piece of user information, whilst other environments are required to retain two mail addresses for one piece of user information. In a conventional technology where specifications of user information are predefined, to change such specifications, software using the user information is changed. However, changing specifications by changing the software may take time and cost.

SUMMARY OF THE INVENTION

It is an object of the present invention to at least partially solve the problems in the conventional technology.

According to an aspect of the present invention, there is provided an information processing apparatus including an input unit that receives operation input from a user; a user-information storage unit that stores therein user information; a specification-information storage unit that stores therein specification information indicative of specifications of the user information stored in the user-information storage unit; and a changing unit that, when the operation input is a request for changing the specification information, changes the specification information stored in the specification-information storage unit.

According to another aspect of the present invention, there is provided an information processing apparatus including a user-information storage unit that stores therein user information; a specification obtaining unit that obtains specification information from at least one of a second information processing apparatus and a storage medium that store therein the specification information indicative of specifications of the user information stored in the user-information storage unit; and a specification-information storage unit that stores the specification information obtained by the specification obtaining unit.

According to another aspect of the present invention, there is provided an information processing method including receiving operation input from a user; changing, when the operation input is a request for changing the specification information stored in a specification-information storage unit, the specification information indicative of specifications of the user information, the specification information stored in the specification-information storage unit.

According to still another aspect of the present invention, there is provided an information processing method including obtaining specification information from at least one of a second information processing apparatus and a storage medium that store therein the specification information indicative of specifications of the user information stored in a user-information storage unit; and storing the specification information obtained at the obtaining in a specification-information storage unit.

According to still another aspect of the present invention, there is provided an information processing system comprising a first information processing apparatus and a second information processing apparatus. The first information processing apparatus including a user-information storage unit that stores therein user information; a requesting unit that requests the second information processing apparatus to transmit specification information indicative of specifications of the user information stored in the user-information storage unit; a specification obtaining unit that receives the specification information transmitted from the second information processing apparatus; and a first specification-information storage unit that stores therein the specification information received by the specification obtaining unit. The second information processing apparatus including a second specification-information storage unit that stores therein the specification information; and a transmitting unit that transmits the specification information stored in the second specification-information storage unit to the first information processing apparatus upon receiving a request from the requesting unit of the first information processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram exemplarily depicting a data configuration of rule information for an entry "user" in the first embodiment;

FIG. 8 is a flowchart of a user logout process according to the first embodiment;

FIG. 9 is a flowchart of a customizing process according to the first embodiment;

FIG. 11 is another example of the customization screen according to the first embodiment;

FIG. 12 is still another example of the customization screen according to the first embodiment;

FIG. 13 is still another example of the customization screen according to the first embodiment;

FIG. 14 is a flowchart of a rule-information writing process according to the first embodiment;

FIG. 16 is a flowchart of a rule-information reading process according to the first embodiment;

FIG. 18 is a flowchart of a customizing process in one modification example according to the first embodiment;

DETAILED DESCRIPTION OF THE PREFERRED EMBODIMENTS

Exemplary embodiments of the present invention are explained in detail below while referring to the accompanying drawings.

Figure 1:
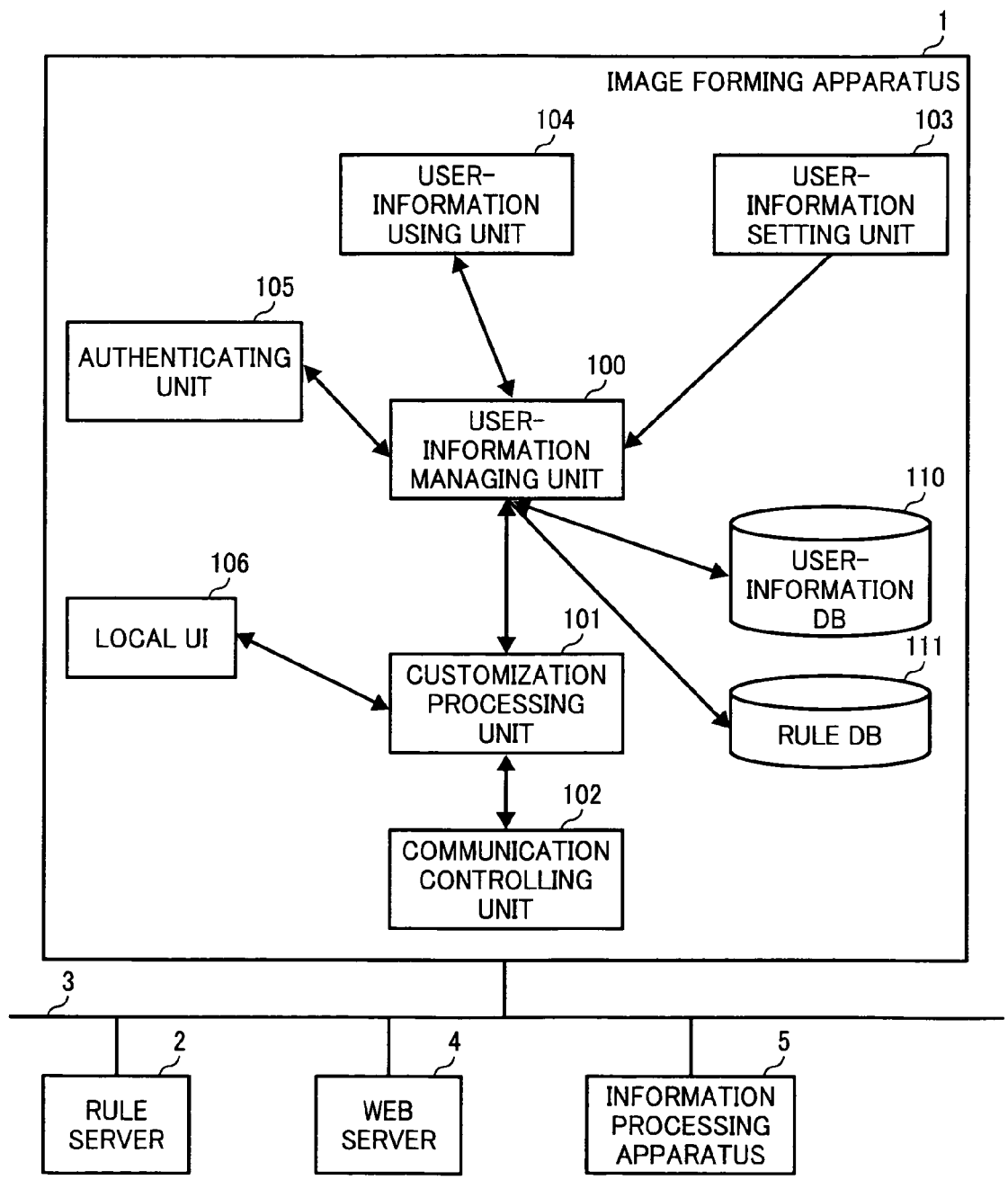
FIG. 1 is a block diagram exemplarily depicting the configuration of a customizing system according to a first embodiment of the present invention.

FIG. 1 is a block diagram of a customizing system according to a first embodiment of the present invention. The customization system includes an image forming apparatus 1, a rule server 2, a Web server 4, and an information processing apparatus 5 connected together via a network 3. The network 3 is, for example, a local-area network (LAN), an intranet, Ethernet (registered trademark), or the Internet. The network 3 can have other devices connected thereto.

Figure 2:
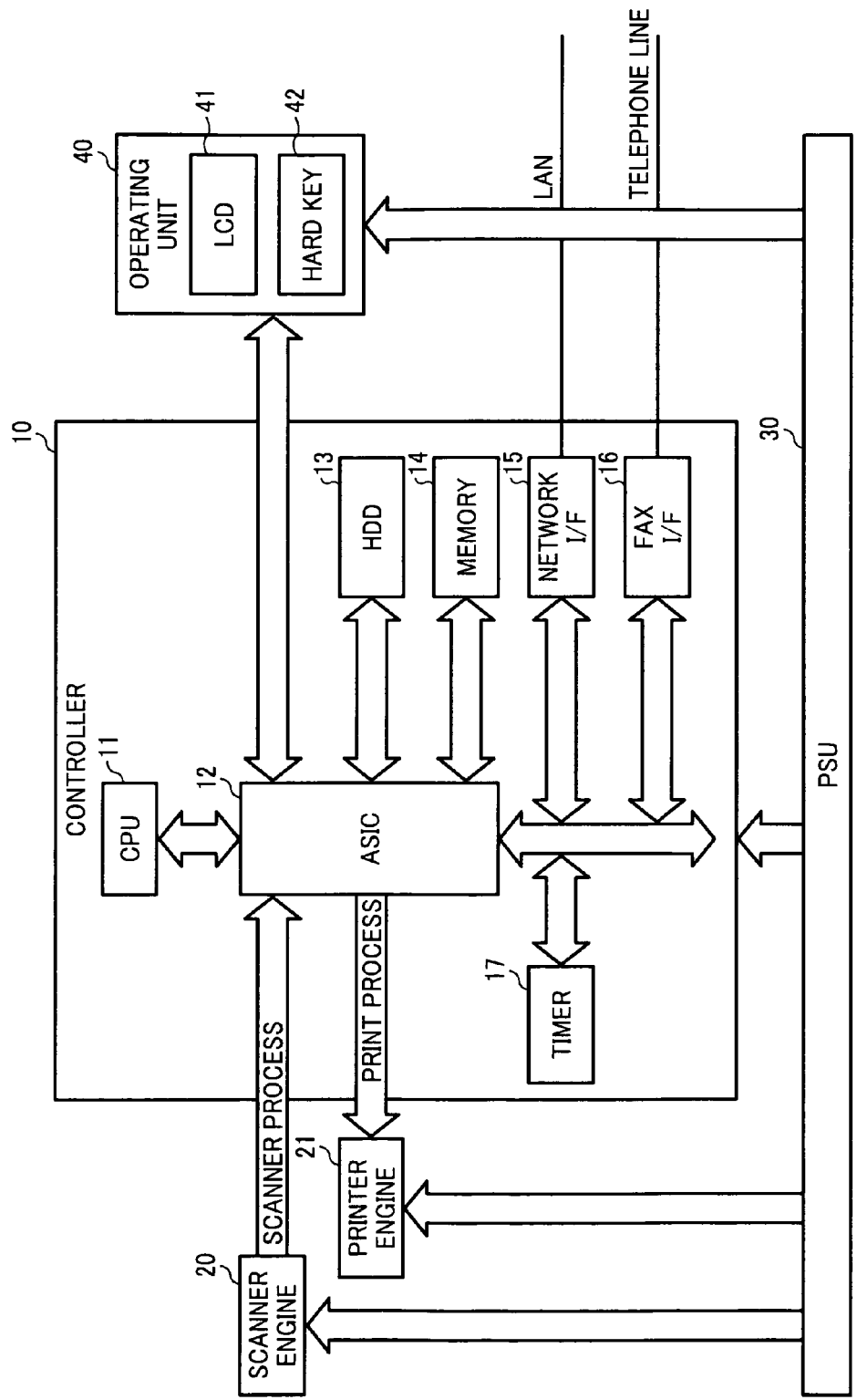
FIG. 2 is a block diagram of a hardware configuration of an image forming apparatus shown in FIG. 1.

FIG. 2 is a block diagram of a hardware configuration of the image forming apparatus 1. The image forming apparatus 1 includes a controller 10, a scanner engine 20, a printer engine 21, a power supply unit (PSU) 30, and an operating unit 40. The controller 10 performs overall control over the image forming apparatus 1. The operating unit 40 receives an operation input from a user and also displays information to the user. The scanner engine 20 is an engine for performing a scanner process for reading an image recorded on a paper medium. The printer engine 21 is an engine for performing a process of printing the image subjected to the scanner process at the scanner engine 20. The PSU 30 controls power supply to the controller 10, the operating unit 40, the scanner engine 20, and the printer engine 21.

The controller 10 includes a central processing unit (CPU) 11, an application specific integrated circuit (ASIC) 12, a hard disk drive 13, a memory 14, a network interface (I/F) 15, a fax I/F 16, and a timer 17. To the ASIC 12, the CPU 11, the HDD 13, the memory 14, the network interface (I/F) 15, the FAX I/F 16, and the timer 17 are connected via a communication bus, and further the operating unit 40, the scanner engine 20, and the printer engine 21 are connected via a Peripheral Component Interconnect (PCI) bus.

The CPU 11 performs overall control over the image forming apparatus 1. The ASIC 12 is an Integrated Circuit (IC) dedicated for image processing with hardware components for image processing. The memory 14 has stored therein various applications to be executed by the CPU 11 and various data for use in executing these various applications. The HDD 13 is a storage unit for storing image data, programs, font data, forms, and distribution-destination information. The operating unit 40 includes a Liquid-Crystal Display (LCD) 41 that displays information to the user and a hard key 42 in which an operation from the user is input. The operating unit 40 may be a touch panel, for example, integrally formed of an operating unit and a displaying unit, or may be a unit formed thereof separately.

Figure 3:
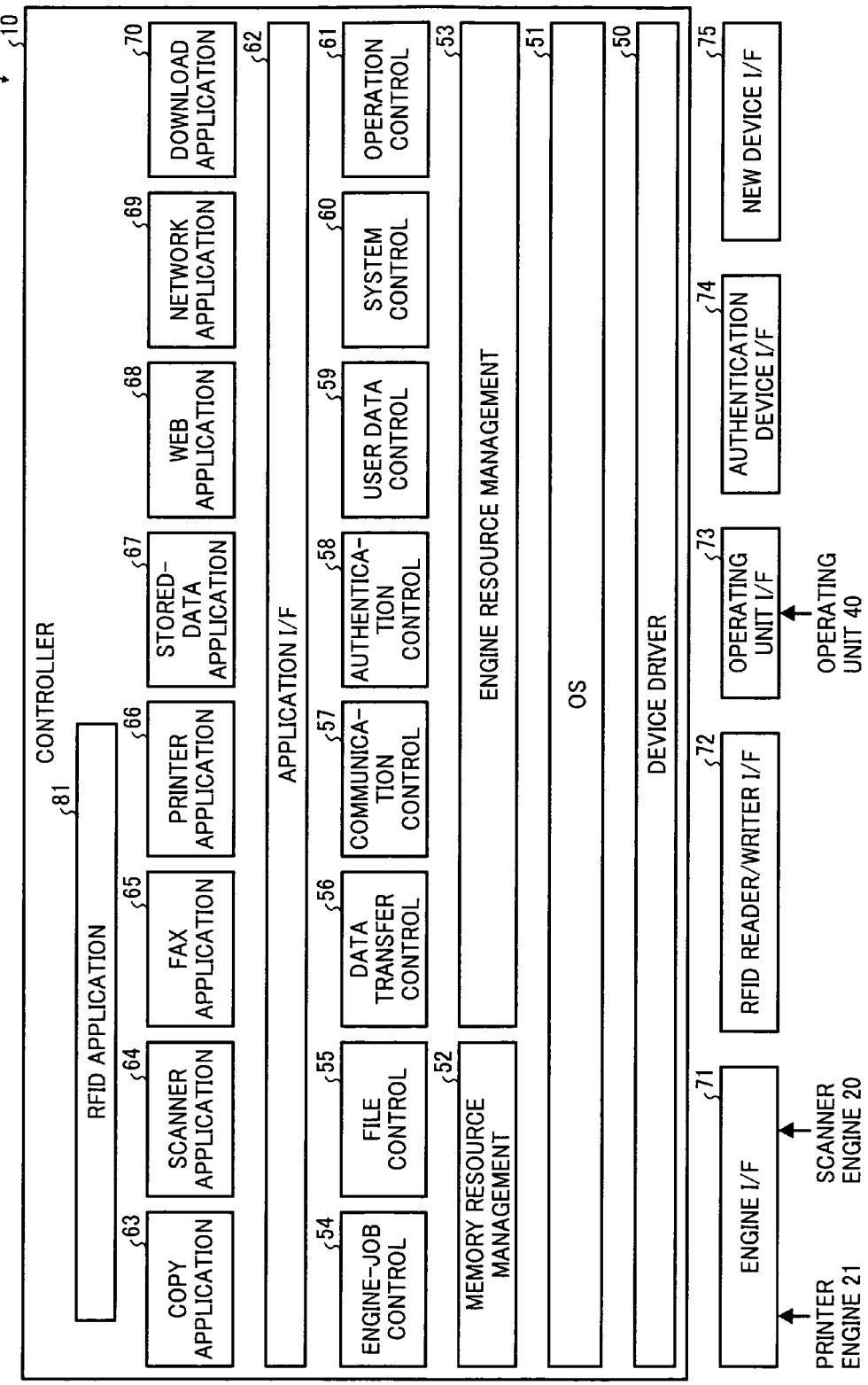
FIG. 3 is a block diagram of a software configuration of the image forming apparatus shown in FIG. 1.

FIG. 3 is a block diagram of a software configuration of the image forming apparatus 1. The image forming apparatus 1 includes a device driver 50, an Operating System (OS) 51, and, as resource managements, a memory resource management 52 and an engine resource management 53. Also, as a control application, the image forming apparatus 1 includes an engine-job control 54 for controlling a job at the scanner engine 20 or the printer engine 21, a file control 55 for controlling reading and writing of files, a data transfer control 56 for controlling data transfer, a communication control 57 for controlling data communication, an authentication control 58 for controlling authentication, such as user login, a user data control 59 for controlling user information, a system control 60 for controlling a system in the image forming apparatus 1, and an operation control 61 for controlling an operation input at the operating unit 40. Furthermore, as applications for achieving various functions, the image forming apparatus 1 includes a copy application 63, a scanner application 64, a FAX application 65, a printer application 66, a stored-data application 67, a Web application 68, a network application 69, a download application 70, and a radiofrequency identification (RFID) application 81, and further includes an application I/F 62 functioning as an interface of these applications. Still further, the image forming apparatus 1 includes an engine I/F 71 functioning as an interface with the scanner engine 20 and the printer engine 21, an operating-unit I/F 73 functioning as an interface with the operating unit 40, an authentication device I/F 74 functioning as an interface with an authentication device (not depicted), a new device I/F 75 functioning as an interface with a new device (not depicted), and an RFID reader/writer I/F 72 functioning as an interface with an RFID reader/writer (not depicted).

Referring back to FIG. 1, the functions achieved in the image forming apparatus 1 with the hardware and software configurations is explained. The image forming apparatus 1 includes a user-information managing unit 100, a customization processing unit 101, a communication controlling unit 102, a user-information setting unit 103, a user-information using unit 104, an authenticating unit 105, and a local-user-interface (local UI) 106. Also, the image forming apparatus 1 includes a user-information database (DB) 110 and a rule DB 111. These user-information DB 110 and the rule DB 111 are substantively stored in the HDD 13, for example. The user-information DB 110 has user information stored therein. The user information is stored for each user, for example, including information, such as "name", "registration number", "password", and "login ID". The rule DB 111 has stored therein rule information indicative of specifications of the user information. Details of this rule information will be explained in detail further below.

The user-information managing unit 100 manages the user-information DB 110 and the rule DB 111, and controls reading of information stored in these databases and writing of information in these databases. The customization processing unit 101 receives a request for customizing the rule information stored in the rule DB 111 and, according to the request, customizes the rule information stored in the rule DB 111 via the user-information managing unit 100. The user-information using unit 104 obtains the user information stored in the user-information DB 110 via the user-information managing unit 100. The user-information setting unit 103 obtains, changes, and deletes the user information stored in the user-information DB 110 via the user-information managing unit 100, and registers new user information in the user-information DB 110. The authenticating unit 105 authenticates user login. The local UI 106 is implemented by, for example, a display screen, which is displayed on the LCD 41 of the operating unit 40. The local UI 106 provides the user with, for example, a customization screen for customizing the rule information and a setting screen for setting the user information. The communication controlling unit 102 controls data communication with other devices.

The data configuration of the rule information stored in the rule. DB 111 is explained. The rule information indicates a schema of the user information, which is configured of a combination of entry types and a combination of attribute rules. Entries indicate respective items regarding the user information, and they have types including, for example, "user", "destination", "transmitter", "user group", "destination group", "headline", "headline set", and "folder". Each entry is associated with a required attribute. The required attribute is an attribute required to be set as an attribute of the entry, such as "name" or "identifier". Also, each entry is associated with an optional attribute as appropriate. The optional attribute is an attribute that is not necessarily required as an attribute of the entry but is set as required, such as "email address" or "FAX number".

An attribute rule is set as a rule regarding each attribute, and is broadly divided into a basic rule and an extended rule. The basic rule has set items, such as "attribute name", "format (type)", "value range (size)", "redundancy permission", "word-wrap value", "required value", "the number of prohibitions for the same settings", "combination", and "initial value". For each of these set items, a value or information is set, thereby setting a rule. Here, redundancy permission indicates, for example, whether redundancy of data is permitted. The word-wrap value indicates data prohibited from being used for the target attribute. For example, as a word-wrap value for an attribute, such as "password", a 2-byte character can be set. The required value indicates data required to be used for the target attribute. For example, as a required value for "email address", "@" can be set. "Combination" indicates data for use in combination of the target attribute. For example, as a combination with "login ID", "password" can be set. The extended rule has set items, such as "encryption OFF/ON", "tampering permitted/prohibited", "output permitted/prohibited", "access permitted/prohibited", "storage destination", and "output destination"

FIG. 4 is a diagram exemplarily depicting a data configuration of rule information for an entry "user". For example, the entry "user" can be associated with attributes, such as "name", "registration number", "password", "login ID", and "email address", and each attribute has set items each with a value or information. With this, a rule is set to the entry "user".

Here, in association with the rule information, the rule DB 111 has stored therein character-specific user information regarding a device that holds the rule information. The device that holds the rule information is exemplified by a storage medium or a server device itself. The character-specific user information has "name", "location", "character information", and the like. Here, the character-specific user information has "character information" regarding the HDD 13 of the image forming apparatus 1 as the device that holds the rule information. In this case, the "character information" includes information for specifying the HDD 13, such as "storage information", "files including paths", and "the maximum number of registrations". Here, when the rule information is transmitted and received via the network 3, the "character information" has "character information" of the device that holds the rule information. The "character information" in this case includes information, such as "IP address/host name", "protocol", and a "protocol's unique information". The "protocol's unique information" indicates information required for data management to access.

Figure 5:
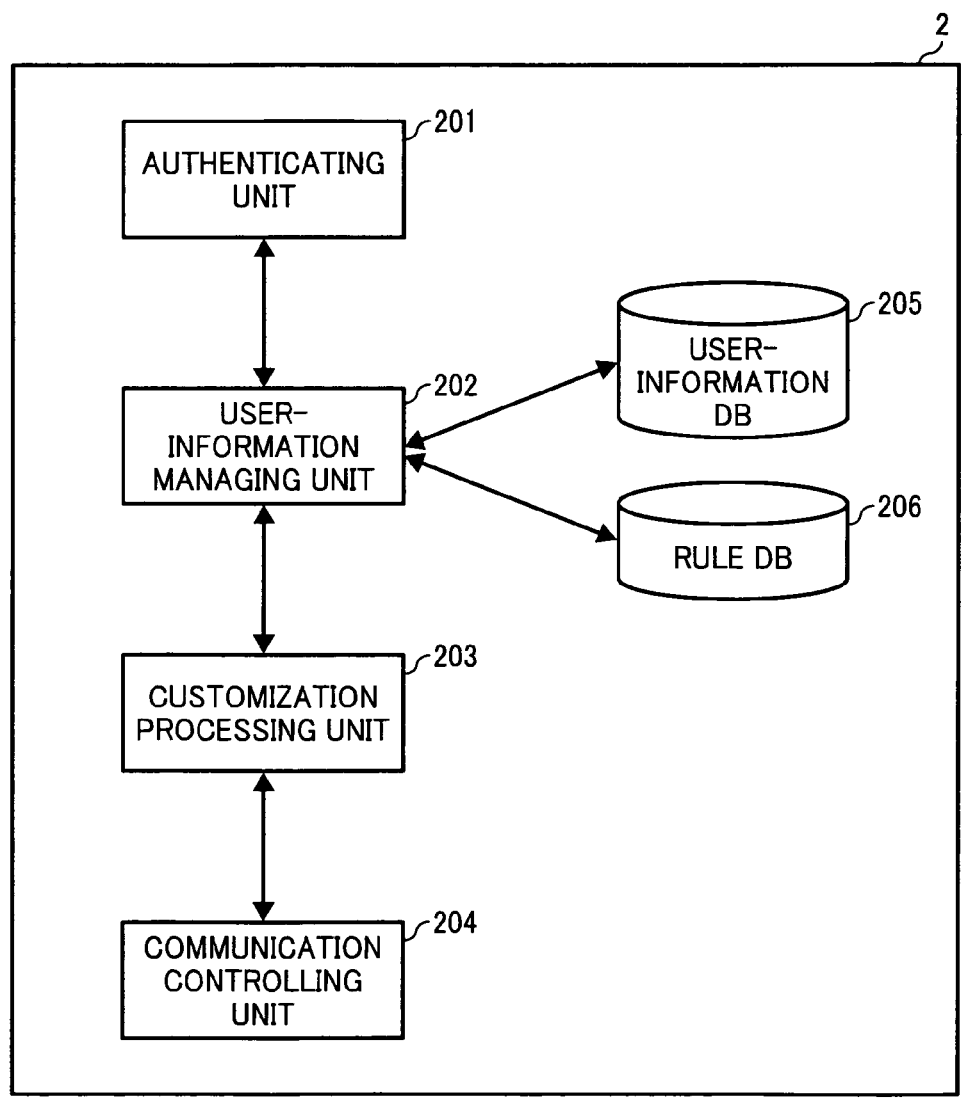
FIG. 5 is a block diagram of a functional configuration of a rule server shown in FIG. 1.

As shown in FIG. 5, the rule server 2 includes a CPU, a read-only memory (ROM), a random access memory (RAM), an external storage device, a communication I/F, and a bus that connects these components (any of them are not depicted), having a hardware configuration with the use of a normal computer. The ROM has stored therein various programs, such as an operating system and an application program for the CPU to control each component of the rule server 2. The external storage device has stored therein various programs executed on the rule server 2 and various data. Also, the external storage device has stored therein user-information DB 205 having stored therein the user information and rule DB 206 having stored therein the rule information. The rule information stored in the rule DB 206 may be identical to or different from the rule information stored in the rule DB 111.

Next, a functional configuration of the rule server 2 is explained. FIG. 5 is a block diagram of a functional configuration of the rule server 2. The rule server 2 includes an authenticating unit 201, a user-information managing unit 202, a customization processing unit 203, and a communication controlling unit 204. The authenticating unit 201 authenticates user login. The user-information managing unit 202 manages the user-information DB 205 and the rule DB 206 to control reading of the information stored in these databases and writing of information to these databases. The customization processing unit 203 receives a request for customizing the rule information stored in the rule DB 206 and, according to the request, customizes the rule information stored in the rule DB 206 via the user-information managing unit 202. The communication controlling unit 204 controls data communication with external devices, such as the image forming apparatus 1, the Web server 4, and the information processing apparatus 5 via the network 3. With the configuration explained above, in response to a request from an external device, the rule server 2 transmits the rule information stored in the rule DB 206 to the external device, and customizes the rule information stored in the rule DB 206.

Next, the configuration of the information processing apparatus 5 is explained. The information processing apparatus 5 includes a CPU that controls the entire apparatus, a ROM having stored therein various programs and data, a RAM, an external storage device such as an HDD, a communication I/F for controlling communication with an external device, an operating device to which an operation from the user is input, a display device that displays information, and a bus that connects these components (any of them are not depicted), having a hardware configuration with the use of a normal computer. The information processing apparatus 5 is connected to the network 3, thereby being capable of communicating with the image forming apparatus 1, the rule server 2, and the Web server 4. Here, for example, the information processing apparatus 5 is assumed to be a portable terminal, such as a cellular phone capable of mobile communication.

Here, a functional configuration achieved by the CPU of the information processing apparatus 5 executing a program stored in the ROM or the external storage device is explained. In the present embodiment, the information processing apparatus 5 has a function of performing data communication with the rule server 2 via the network 3 and customizing the rule information stored in the rule DB 206 included in the rule server 2. Also, in the image forming apparatus 1, when the information processing apparatus 5 is specified as a rule-information writing destination and the rule information is transmitted from the image forming apparatus 1, the information processing apparatus 5 receives the rule information, and causes the rule information to be stored in the external storage device.

<Configuration of the Web Server>

The Web server 4 includes a CPU, a ROM, a RAM, an external storage device, a communication I/F, and a bus connecting these components (any of them are not depicted), having a hardware configuration with the use of a normal computer. The Web server 4 is connected to the network 3, thereby capable of communicating with the image forming apparatus 1, the rule server 2, and the information processing apparatus 5 and receiving the rule information.

Figure 6:
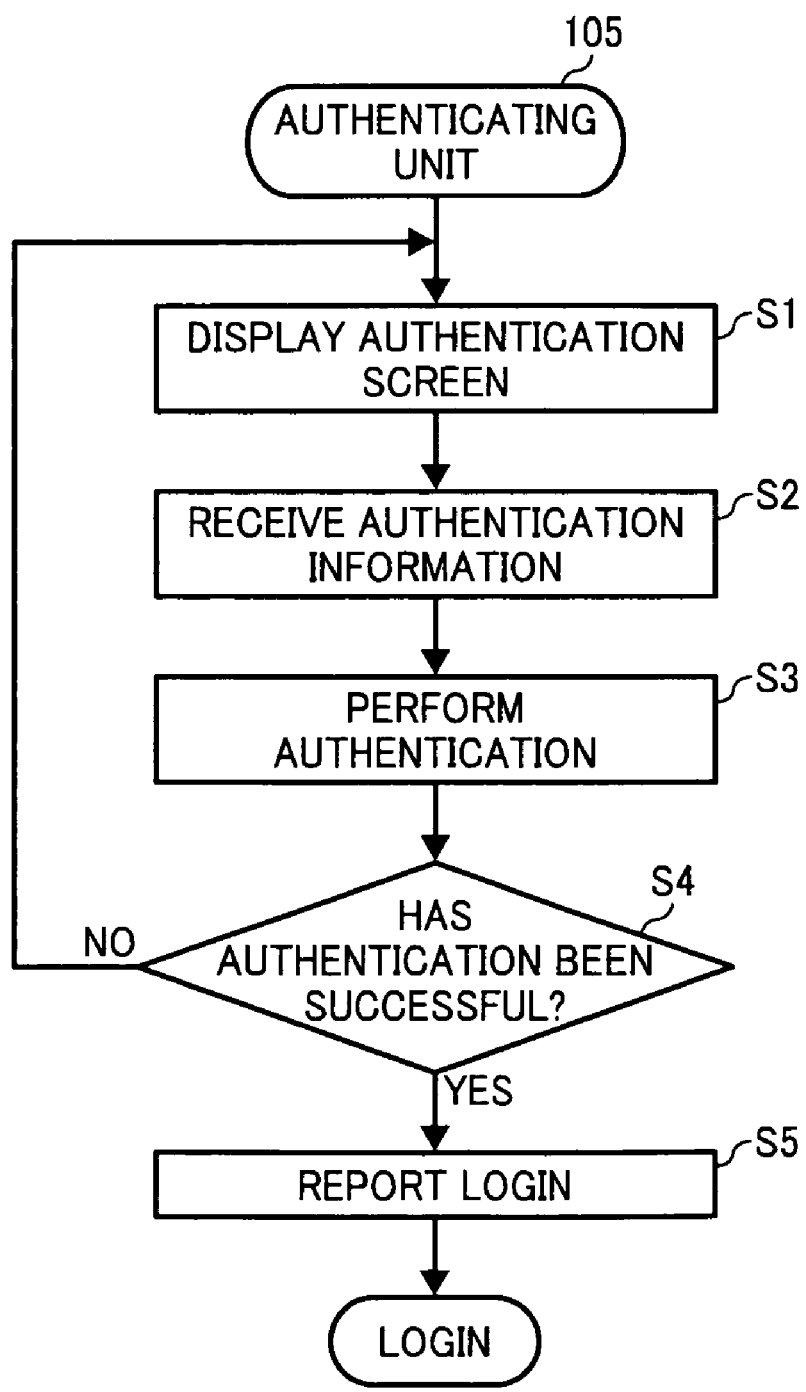
FIG. 6 is a flowchart of a user login process according to the first embodiment.

Next, the operation of the image forming apparatus 1 is explained. First, a user login process is explained. FIG. 6 is a flowchart of the user login process. When the image forming apparatus 1 is powered on and activated, the authenticating unit 105 causes an authentication screen to be displayed on the LCD 41 of the operating unit 40 (step S1). On this authentication screen, the user operates the hard key 42 of the operating unit 40 of the image forming apparatus 1 to input a login ID and a password as authentication information, the authenticating unit 105 receives the input (step S2), and performs authentication by using the login ID and the password (step S3). For example, when a combination of the login ID and the password is stored in advance in the user-information DB 110, the authenticating unit 105 determines that authentication has been successful ("YES" at step S4) to allow the user login, and reports as such to the customization processing unit 101, the user-information setting unit 103, and the user-information managing unit 100 (step S5).

Figure 7:
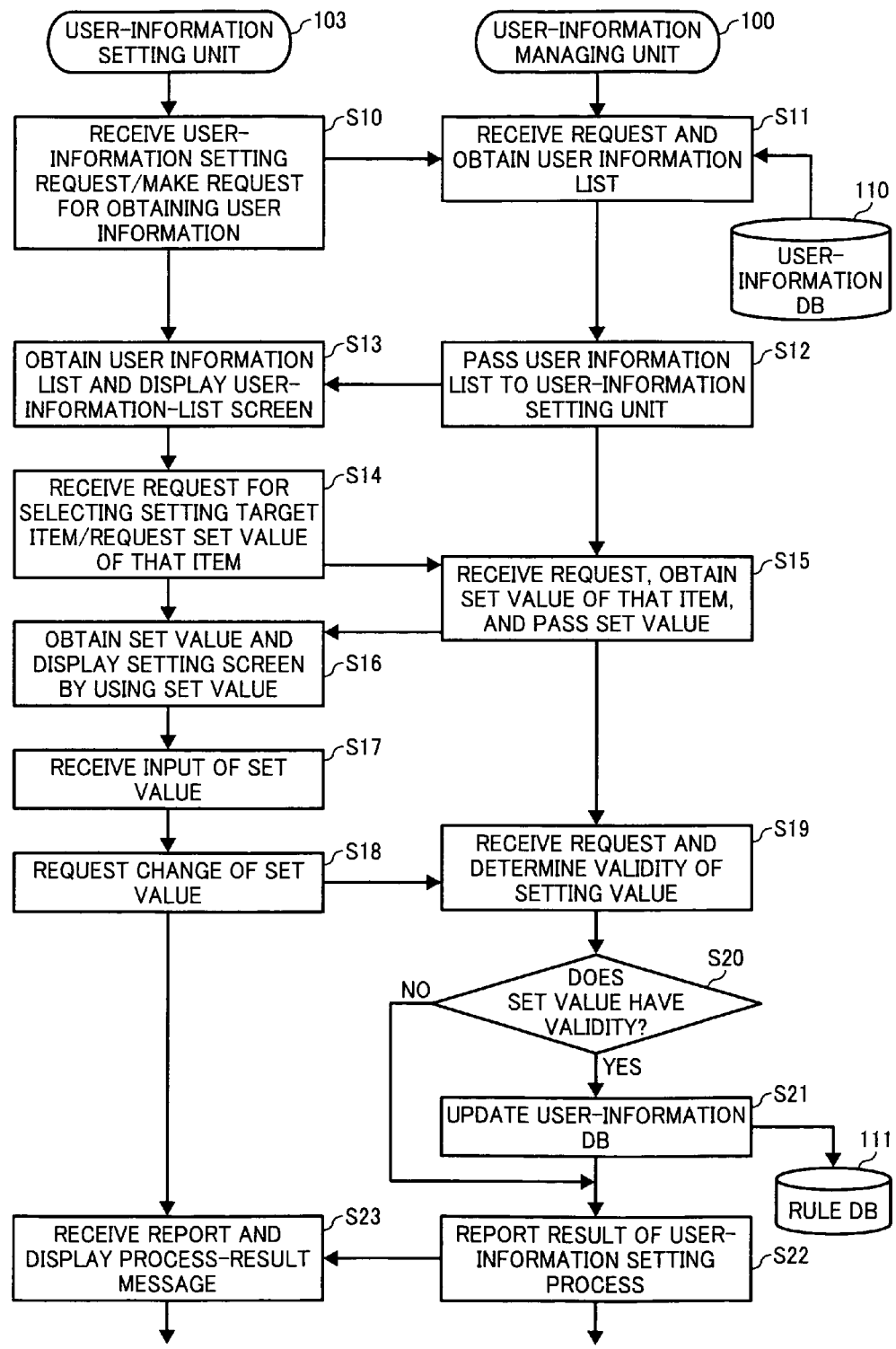
FIG. 7 is a flowchart of a user information obtaining/setting process according to the first embodiment.

Next, a process of obtaining and setting the user information stored in the user-information DB 11 is explained after user login. FIG. 7 is a flowchart of a user information obtaining/setting process. After user login, when a request for setting the user information is input via the operating unit 40 of the image forming apparatus 1, the user-information setting unit 103 requests the user-information managing unit 100 to obtaining the user information (step S10). Upon receiving the request, the user-information managing unit 100 obtains the user information stored in the user-information DB 110 (step S11), and passes the user information to the user-information setting unit 103 (step S12) in a list format. The user-information setting unit 103 receives the user information list, and causes a user-information-list screen indicating a list of user information to be generated and displayed by the operating unit 40 (step S13). When an input for selecting an item to be set (for example, "email address") on this user-information-list screen, the user-information setting unit 103 receives this input, and requests the user-information managing unit 100 for a set value of that item (step S14). Upon receiving the request, the user-information managing unit 100 refers to the user-information DB 110, obtains the set value of the target item, and passes the set value to the user-information setting unit 103 (step S15). Upon reception of the set value of the target item, the user-information setting unit 103 generates a setting screen for changing the set value of the target item, and causes the setting screen to be displayed by the operating unit 40 (step S16). On this setting screen, when an input for the set value of the item is provided, the user-information setting unit 103 receives the input (step S17), and requests the user-information managing unit 100 to change the set value of the item to the input set value (step S18). Upon receiving the request, the user-information managing unit 100 performs a validity determining process of determining whether the set value of the item is valid (step S19).

In the validity determining process, it is determined whether the set value of the item to be changed complies with the rule information stored in the rule DB 111. The user-information managing unit 100 reads the rule information regarding the item stored in the rule DB 111, and determines whether the set value of the item to be changed complies with the rule information. For example, when the target item is "email address", the compliance of the input set value is determined according to the rule information depicted in FIG. 4. For example, for the set value input as "email address", it is determined whether the set value is within a range of "0 to 128 characters" as an attribution rule regarding "range" and whether the set value includes alphanumeric characters and "@" as an attribution rule regarding "required value". When it is determined that the input set value complies with all attribution rule, it is determined that the set value is valid. If it is determined as a result of the validity determining process that the set value of the item to be changed is valid ("YES" at step S20), the user-information managing unit 100 applies a change of the set value and, changes, according to the set value, the set value of the item of the user information stored in the user-information DB 110 (step S21). The user-information managing unit 100 then reports the result of the validity determining process on the set value requested to be changed to the user-information setting unit 103 (step S22). The user-information setting unit 103 then causes a message indicative of the result of the process to be displayed by the operating unit 40 (step S23).

FIG. 8 is a flowchart of a user logout process. After the login process, when the image forming apparatus 1 receives a request for logout via the operating unit 40 (step S30), the authenticating unit 105 receives the logout request, and reports to the customization processing unit 101, the user-information setting unit 103, and the user-information managing unit 100 that the user has been logged out (step S31)

Next, a customizing process for customizing the rule information is explained. Here, a case is explained in which the rule information stored in the rule DB 111 stored in the HDD 13 is customized.

Figure 10:
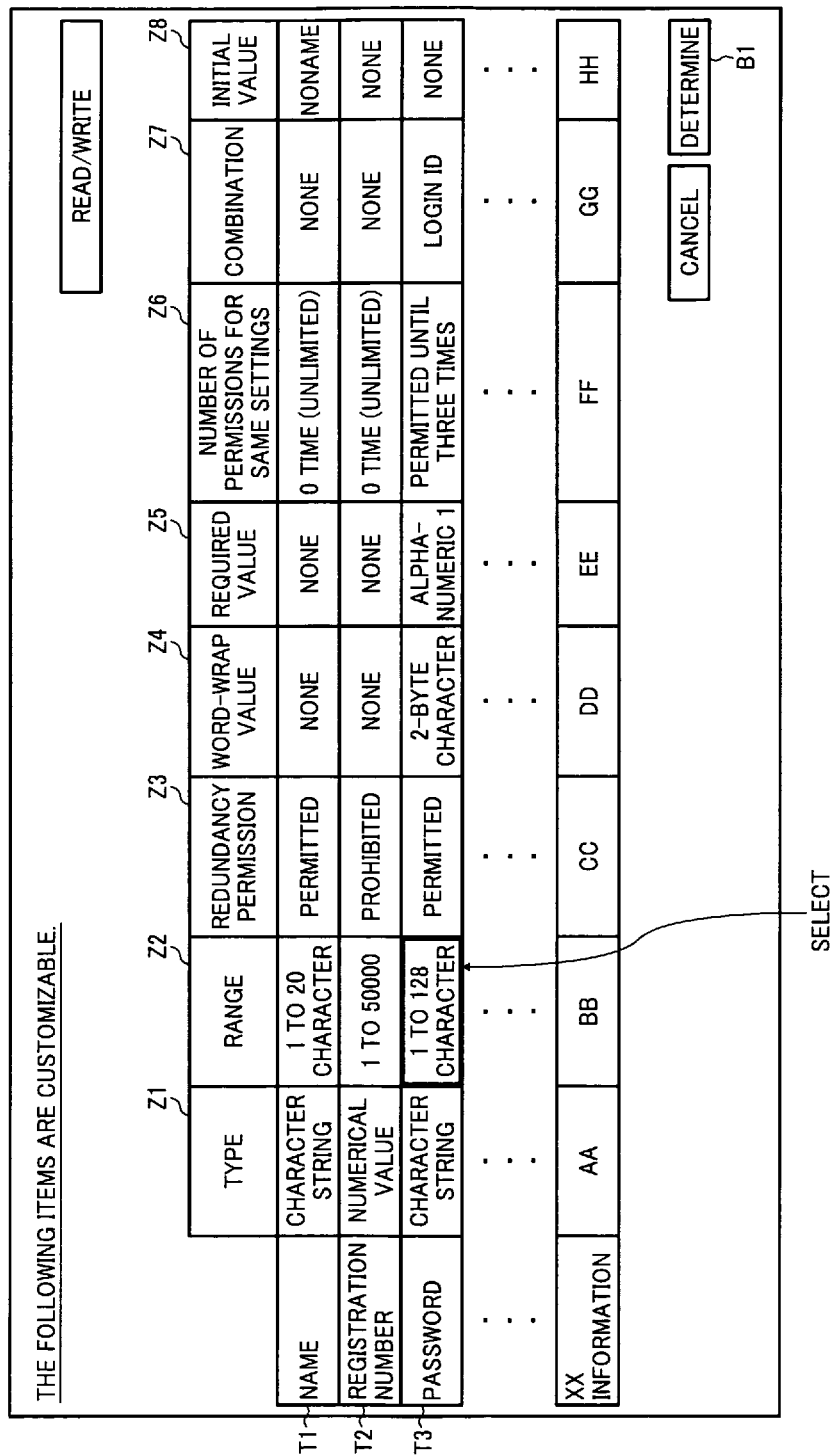
FIG. 10 is an example of a customization screen according to the first embodiment.

FIG. 9 is a flowchart of the customizing process. When a request for the customizing process is input via the operating unit 40 of the image forming apparatus 1, the customization processing unit 101 receives the input (step S40), and requests the user-information managing unit 100 to obtain the rule information (step S41). Upon receiving the request, the user-information managing unit 100 obtains the rule information stored in the rule DB 111 (step S42), and passes the rule information to the customization processing unit 101 (step S43). Upon reception of the rule information, the customization processing unit 101 generates a customization screen indicative of a list of the rule information, and causes this list to be displayed by the operating unit 40 (step S44). On the customization screen, the user can input for changing the rule information. FIGS. 10 and 11 are drawings of screen examples each exemplifying the customization screen. In the screen example in FIG. 10, target items T1 to T3 and attributes Z1 to Z8 are depicted. In this screen, when the user selects a target item (here, T3 "password" is assumed) and an attribute (here, Z2 "range" is assumed) and presses a determination button B1, the customization processing unit 101 generates a screen as depicted in FIG. 11, and causes this screen to be displayed by the operating unit 40. In this screen, the target item T3 selected by the user and an attribute rule ZR1 are depicted. The user provides an input for changing the set value of the target item to the screen and presses a determination button B3, the customization processing unit 101 receives the change of the set value of the target item (step S45), and requests the user-information managing unit 100 to change the set value of the target item (step S46). Upon receiving the request, the user-information managing unit 100 changes the set value of the target item of the rule information stored in the rule DB 111 according to the request (step S47).

In this manner, the image forming apparatus 1 changes the rule information stored in the rule DB 111 to customize the rule information. Here, the user can change a target item to be changed and an attribute rule. Every time the user makes a request for changing the set item, the processes at steps S45 to S48 are repeated. Here, the rule DB 111 is updated every time the determination button B3 for an input for changing the set value is pressed. However, in the present embodiment, this is not meant to be restrictive, and various timings are possible. After the set value of the target item is changed at step S47, the user-information managing unit 100 reports to the user-information setting unit 103, the customization processing unit 101, and the authenticating unit 105 that the set value of the target item has been changed (step S48). Upon reception of the report, the customization processing unit 101 causes a massage indicating that changing the rule information has been completed to be displayed by the operating unit 40 (step S49). Then, when a request for completing customization is input via the operating unit 40, the customization processing unit 101 receives the input, and then ends the customizing process.

Here, at step S44, in the customization screen depicted in FIG. 10, when the user selects a target item (for example, T3 "password" is assumed) and presses the determination button B1, the customization processing unit 101 generates a screen as depicted in FIG. 12, and causes this screen to be displayed by the operating unit 40. FIG. 12 is a drawing of a screen example exemplifying the customization screen. In this screen, an attribute rule ZR2 regarding all attributes for the selected target item (here, T3 "password") is displayed. In this screen, the user can provide an input for changing each set value of each attribute of the selected target item.

Also, at step S44, in the customization screen depicted in FIG. 10, when the user selects an attribute (for example, Z1 "type" is assumed) and presses the determination button B1, the customization processing unit 101 allows a screen as depicted in FIG. 13 to be displayed by the operating unit 40. FIG. 13 is a drawing of a screen example exemplifying the customization screen. In this screen, for the selected attribute rule, (here, Z1 "type"), a correspondence relation among settable set values A1 to A11 and target items T1 to T3 is displayed. In this screen, the user can provide an input for changing each set value of the attribute for the target item.

As explained above, by storing the rule information indicative of the specifications of the user information and changes the rule information according to an operation input from the user, time and cost for changing the specifications of the user information can be reduced.

Figure 15:
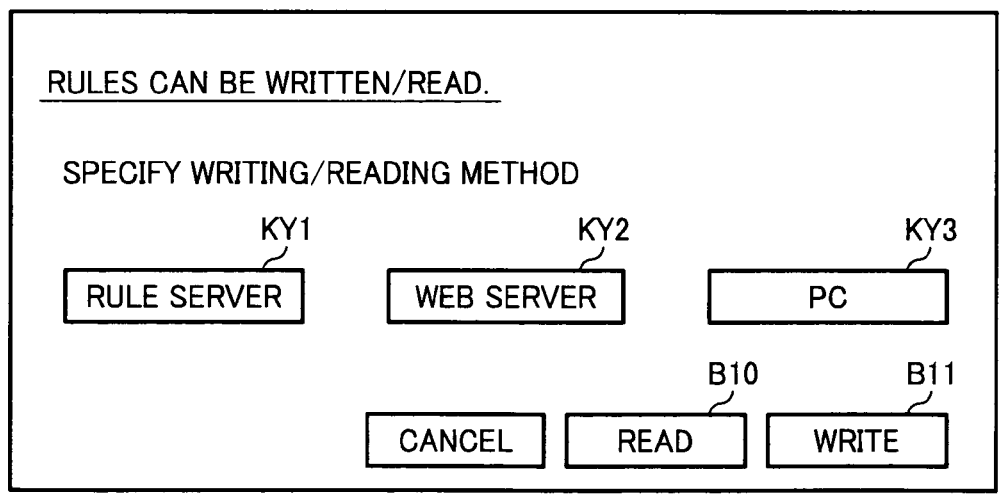
FIG. 15 is an example of a reading/writing-method specifying screen according to the first embodiment.

Next, a process of the image forming apparatus 1 is explained to write the rule information stored in the rule DB 11 to an external device. The external device is assumed to be Web server 4, for example. FIG. 14 is a flowchart of a procedure of a rule-information writing process according to the first embodiment. When a transition to the rule-information writing process is requested via the operating unit 40 of the image forming apparatus 1 (step S60), the customization processing unit 101 receives the input, and generates a reading/writing-method specifying screen, and causes this screen to be displayed by the operating unit 40 (step S61). FIG. 15 is a drawing of a screen example exemplifying a reading/writing-method specifying screen. In this screen, rule-information writing destinations or reading sources KY1 to KY3 are displayed. Also, a writing button B11 for specifying writing of the rule information and a reading button B10 for specifying reading of the rule information are displayed. Reading of the rule information will be explained further below. In this screen, when the user specifies a rule-information writing destination (here, for example, KY2 "Web server" is assumed), and presses the writing button B11, the customization processing unit 101 receives the input (step S62), and requests the user-information managing unit 100 to write the rule information to the specified writing destination (step S63). Upon receiving the request, the user-information managing unit 100 obtains the rule information stored in the rule DB 111 (step S64), and passes the rule information to the communication controlling unit 102 to make a request for transmitting the rule information to the specified writing destination (Here, Web server 4) (step S65). Upon receiving the request, the communication controlling unit 102 transmits the rule information to the Web server 4, which is the writing destination (step S66). Then, upon completion of the transmission of the rule information, the communication controlling unit 102 reports as such to the user-information managing unit 100 (step S67). Upon receiveance of the report, the user-information managing unit 100 reports to the customization processing unit 101 that transmission of the rule information has been completed (step S68). Upon reception of the report, the customization processing unit 101 causes a message indicating that writing of the rule information has been completed to be displayed by the operating unit 40 (step S69).

According to this configuration, in another external device, such as the Web server 4, it is possible to apply the rule information held by the image forming apparatus 1 and easily customize the rule information. Also, a device performing a rule-information writing process is not restricted to the image forming apparatus 1, but may be another device (for example, the rule server 2) connected to the network 3. For example, the rule server 2 performs a rule-information writing process on an external device, such as the Web server 4, as with the rule information held by the rule server 2, the rule information of the Web server can be obtained and applied. Also, the rule server 2 can perform a rule-information writing process on a plurality of devices. With such distribution of the rule information, the load on the rule server 2 can be reduced.

Next, a reading process of the image forming apparatus 1 is explained to obtain the rule information from an external device and causing the rule information to be stored in the rule DB 111. Here, the external device is assumed to be the rule server 2. FIG. 16 is a flowchart of a rule-information reading process. When a input of making a request for transition to the rule-information reading process is provided via the operating unit 40 of the image forming apparatus 1, the customization processing unit 101 receives the input (step S80), and causes a reading/writing-method-specifying screen depicted in FIG. 15 to be displayed by the operating unit 40 (step S81).

In the screen, when the user specifies a rule-information reading source (here, KY1 "rule server" is assumed, for example) and presses the reading button B10, the customization processing unit 101 receives the input (step S82), and requests the user-information managing unit 100 to obtain the rule information from the specified reading source (here, the rule server 2) (step S83). Upon receiving the request, the user-information managing unit 100 requests the communication controlling unit 102 to obtain the rule information from the reading source (step S84). Upon receiving the request, the communication controlling unit 102 transmits to the rule server 2, which is a reading source, a request message for requesting transmission of the rule information (step S85). On the other hand, the rule server 2 transmits, upon reception of the request message, the rule information stored in the rule DB 206 to the image forming apparatus 1. Upon reception of the rule information transmitted according to the request (step S86), the image forming apparatus 1 passes this rule information to the user-information managing unit 100 (step S87). Upon reception of the rule information from the communication controlling unit 102, the user-information managing unit 100 causes the rule information to be stored in the rule DB 111 (step S88). Next, the user-information managing unit 100 reports to the customization processing unit 101 that obtaining the rule information has ended (step S89). Upon reception of the report, the customization processing unit 101 causes a message indicating the reading of the rule information has ended to be displayed by the operating unit 40 (step S90).

With this configuration, in the image forming apparatus 1, the rule information held by another external device, such as the rule server 2, can be applied, thereby easily customizing the rule information. Also, with this configuration, addition and deletion of a target item in the rule information can be easily made. Furthermore, the device performing a process of reading the rule information is not restricted to the image forming apparatus 1, but may be another apparatus or device connected to the network 3, (for example, the information processing apparatus 5). For example, since the information processing apparatus 5 does not have a rule DB, by performing a process of reading the rule information, the information processing apparatus 5 can apply the rule information to its own apparatus.

Furthermore, with the configurations, for example, another external device can perform the reading process on the rule information written to the Web server 4 in the writing process, thereby reading the rule information. That is, even with this configuration, the rule information can be shared among a plurality of apparatuses or devices to customize the rule information.

Here, the external device targeted for the rule-information writing process and the external device targeted for the rule-information reading process may be, for example, either of the rule server 2 and the Web server 4, another apparatus or device connected to the network 3 such as the information processing apparatus 5), another image forming apparatus, or a storage device connected to the image forming apparatus 1 as a peripheral device (for example, a Secure Digital (SD) card, a Universal Serial Bus (USB) memory, a Flexible Disk (FD), a Magnetic Disk (MD), or an external Hard Disk Drive (HDD)). Also, the reading target or the writing destination may be an electronic mail, FAX, folder, or others. Also, the writing destination may be a paper medium. That is, the rule information may be printed on a paper medium. Furthermore, the rule information to be written may be configured to be encrypted, or an electronic signature may be generated for the rule information.

Here, in the reading process, the rule information subjected to the reading process is stored in the rule DB 111. At this time, by using the rule information subjected to the reading process, the rule information stored in the rule DB 111 may be updated. Alternatively, the rule information stored in advance in the rule DB 111 and the rule information subjected to the reading process may be distinguishably stored. For example, a read flag may be associated with the rule information subjected to the reading process for storage, and the image forming apparatus 1 may refer to the read flag to validate one of these pieces of rule information and not validate the other according to a predetermined condition.

Figure 17B:
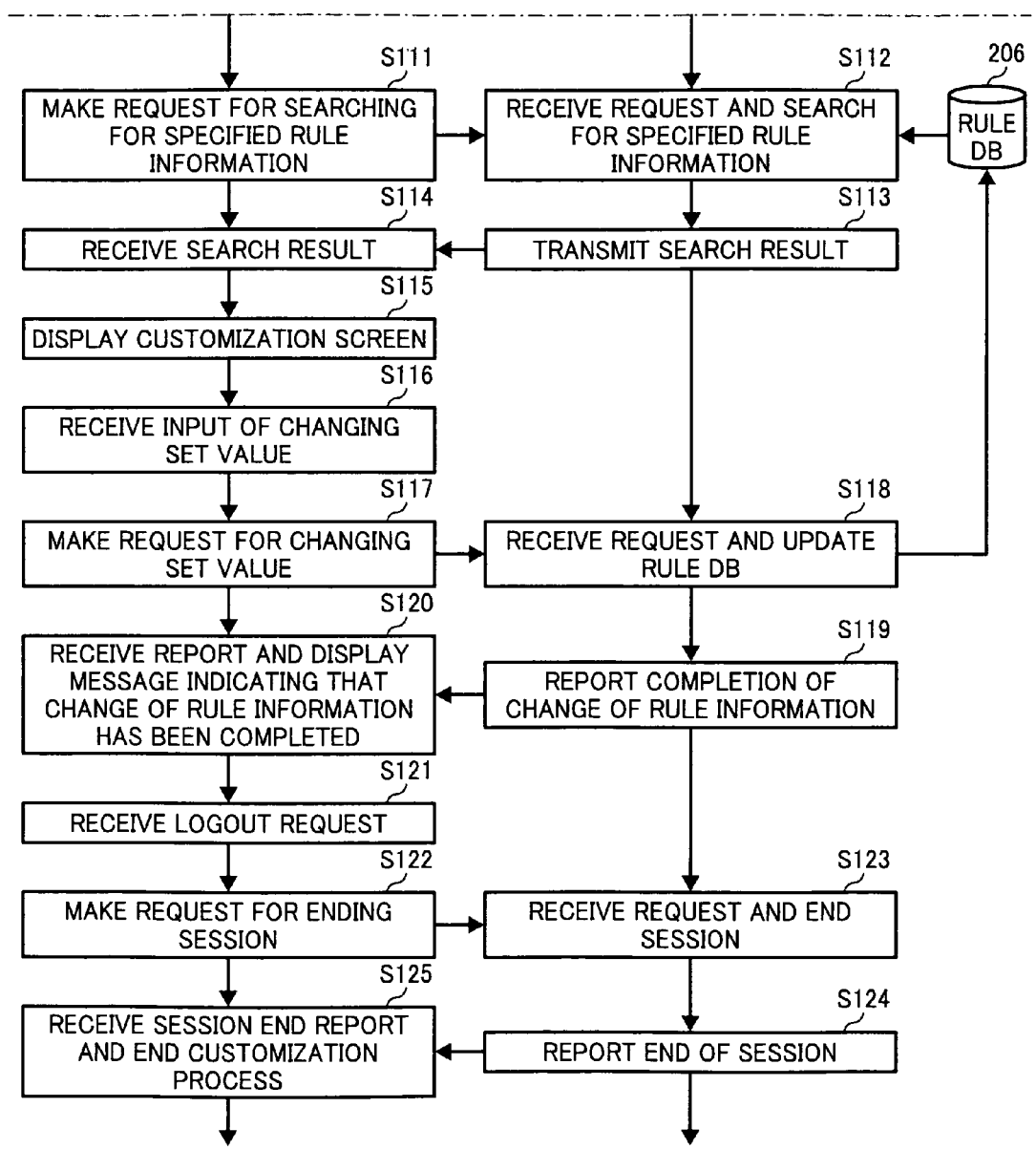
FIG. 17 is a flowchart of a process performed by an information processing apparatus shown in FIG. 1 when accessing the rule server to customize the rule information, according to the first embodiment.

Next, a process of the information processing apparatus 5 is explained to access the rule server 2 via the network 3 to customize the rule information. FIG. 17 is a flowchart of a process of the information processing apparatus 5 accessing the rule server 2 to customize the rule information.

Upon receiving an input from the user of making a request for customizing the rule information via an operating device (step S100), the information processing apparatus 5 causes an authentication screen to be displayed on a display device (step S101). In the authentication screen, when the user enters a login ID and a password as authentication information, the input is accepted (step S102), and a request message is transmitted to the rule server 2 for making a request for starting a session (step S103). The rule server 2 then receives the request message with the function of the communication controlling unit 204, and transmits a response message to the information processing apparatus 5, indicative of the start of the session. Furthermore, the rule server 2 transmits a request message to the information processing apparatus 5 for making a request for authentication information (step S104). Upon reception of the response message and the request message, the information processing apparatus 5 transmits the login ID and password whose input was accepted at step S102 as authentication information (step S105). Upon reception of the authentication information (step S106), the rule server 2 performs authentication by using the login ID and the password with the function of the authenticating unit 201 (step S107). When the combination of the login ID and the password is stored in advance in the user-information DB 205, the rule server 2 determines that authentication has been successful, allows login of the user, and transmits to the information processing apparatus the authentication result indicating that authentication has been successful (step S108).

Upon reception of the authentication result (step S109), the information processing apparatus 5 receives an input from the user of specifying rule information to be customized (step S110), and then transmits to the rule server 2 a request message for making a request for customizing the rule information (step S111). With the function of the customization processing unit 203, the rule server 2 refers to the rule DB 206 to search for the rule information requested to be customized (step S112). The rule server 2 then transmits the relevant rule information as the search result to the information processing apparatus 5 (step S113). Upon reception of the search result (step S114), the information processing apparatus 5 generates a customization screen for the rule information as the search result, and causes the screen to be displayed (step S115). The customization screen is, for example, the one exemplarily depicted in FIG. 10. In this screen, when an input for changing the set value of the rule information or an input for determining the change is provided, the information processing apparatus 5 receives the change of the set value of the rule information (step S116), and transmits to the rule server 2 a request message for making a request for changing the set value of the rule information (step S117). Upon reception of the request message, the rule server 2 changes the set value of the rule information stored in the rule DB 206 according to the request (step S118). After changing the set value, the rule server 2 transmits to the information processing apparatus 5 a change completion message indicating that the set value has been changed (step S119). Upon reception of the change completion message, the information processing apparatus 5 causes a message to be displayed, indicating that the change of the rule information has been completed (step S120).

Here, the user can also change a target item or an attribute rule to be changed. Every time the user makes a request for changing a set value, the processes at step S116 to S120 are repeated. Here, the rule information in the rule DB 206 is changed every time a set value is changed. In the present embodiment, however, this is not meant to be restrictive, and various timings are possible. Then, upon receiving the input from the user for making a request for logout (step S121), the information processing apparatus 5 transmits to the rule server 2 a request message for making a request for the end of the session (step S122). Upon reception of the request message, the rule server 2 ends the session (step S123), and transmits to the information processing apparatus 5 a session end message indicating as such (step S124). Upon reception of the session end message (step S125), the information processing apparatus 5 ends the customizing process.

Here, the information processing apparatus can be configured to be able to customize not only the rule information in the rule server 2 but also rule information held by the image forming apparatus 1 or other external devices or apparatuses. Furthermore, although the information processing apparatus 5 customizes the rule information of one external apparatus in the present embodiment, the information processing apparatus 5 can be configured to be able to perform similar customization on a plurality of external apparatuses or devices. For example, on the external apparatuses holding a common piece of rule information, a change of a set value of the rule information is performed simultaneously, and a request message for making a request for changing the set value is transmitted to these external apparatuses. Each of the external apparatuses changes the rule information held by itself according to the request message.

Still further, after the process at step S120, the information processing apparatus 5 may obtain the rule information stored in the rule DB 206 of the rule server 2, and may apply the obtained rule information as the rule information of the information processing apparatus 5.

It has been explained above that the customization processing unit 101 generates a customization screen and causes the screen to be displayed by the operating unit 40. Alternatively, the local UI 106 may be made to generate a customization screen and cause the screen to be displayed by the operating unit 40. It is assumed herein that the rule information stored in the rule DB 11 is customized as appropriate at the image forming apparatus 1. FIG. 18 is a flowchart of a customizing process in the present modification example. When a request for customizing the rule information is input via the operating unit 40 of the image forming apparatus 1, processes similar to those at steps S40 to S43 are preformed. The customization processing unit 101 receives the rule information for customization as a search result. Next, the customization processing unit 101 passes the search result to the local UI 106 (step S400). Upon reception of the search result, the local UI 106 causes a customization screen for the rule information as the search result to be displayed by the operating unit 40 (step S401). In the customization screen displayed on the operating unit 40, when the user provides an input for changing a set value of the rule information in a manner similar to the customizing process, the local UI 106 receives the input (step S402), and causes a setting-result screen indicative of the rule information with its set value changed to be displayed by the operating unit 40 (step S403). In this screen, when the user provides an input for determining the change of the set value of the rule information, the local UI 106 receives the input, and requests the customization processing unit 101 to change the set value of the rule information (step S404). Upon receiving the request, the customization processing unit 101 requests the user-information managing unit 100 to change the set value of the rule information (step S405). Upon receiving the request, the user-information managing unit 100 changes the set value of the rule information stored in the rule DB 111 according to the request (step S47). Then, the process at step S48 is performed in a manner similar to that explained above. After step S48, the procedure goes to step S406. At step S406, the customization processing unit 101 reports to the local UI 106 that the set value has been changed. Next, upon reception of the report, the local UI 106 causes a message to be displayed by the operating unit 40, indicating that the customizing process has ended (step S407).

Here, at step S41, all pieces of rule information stored in the rule DB 111 may be requested for customization, or only the specified piece of rule information may be requested for customization.

The rule information to be subjected to the reading process or the writing process may be all pieces of rule information stored as rule information in the rule DB 111, the rule DB 206, or the like, or may be only the specified rule information. Also, in each customizing process, the rule information to be customized may be all pieces of rule information stored as rule information in the rule DB 111, the rule DB 206, or the like, or may be only the specified rule information.

Next, a second embodiment of the present invention is explained. Portions common to those in the first embodiment are explained by using the same reference numerals or are not explained herein.

In the second embodiment, a correspondence relation between the rule server 2 and the image forming apparatus 1 is set in advance as a master device and a slave device, respectively. The slave device follows the rule of the master device. Here, when the image forming apparatus 1 enters an application area where the rule of the master device is to be followed, the rule information stored in the rule DB 206 of the rule server 2 is applied. Specifically, when the image forming apparatus 1 enters an application area where the rule of the master device is to be followed, for example, when an input indicating that the rule of the master device is to be followed is provided at the operating unit 40 of the image forming apparatus 1, the customization processing unit 101 of the image forming apparatus 1 requests the rule server 2 to search for the master device. As a result of searching, when the master device is found, the user-information managing unit 100 of the image forming apparatus 1 obtains the rule information stored in the rule DB 206 of the rule server 2 via the communication controlling unit 102 and, by using this rule information, updates the rule information stored in its own rule DB. In this manner, the image forming apparatus 1 applies the rule information of the rule server 2. Here, the rule server 2 as the master device has stored in advance in an external storage device or the like information indicating that the rule server 2 itself is the master device and, with the function of the customization processing unit 203, by using the information, it is determined that the rule server 2 itself is the master device. The image forming apparatus 1 is not assumed to have stored therein in advance information for specifying which is the master device.

Figure 19:
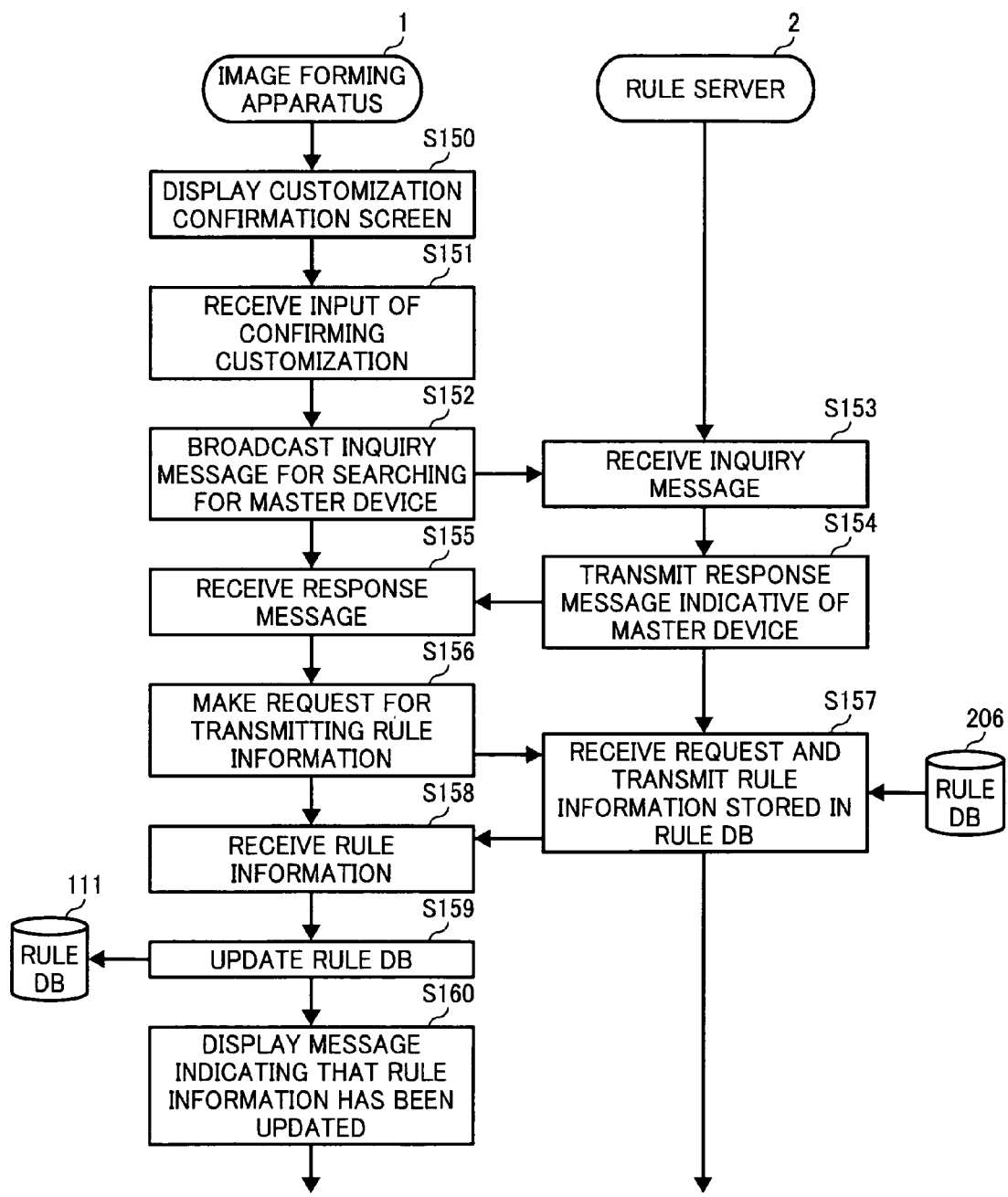
FIG. 19 is a flowchart of a customizing process when an information processing apparatus according to a second embodiment applies rule information of a master device.

Next, the procedure of a customizing process when the image forming apparatus 1 applies the rule information of the master device (here, the rule server 2) is explained. FIG. 19 is a flowchart of a customizing process when the image forming apparatus 1 applies the rule information of the master device.

When the image forming apparatus 1 enters an application area where the rule of the master device is to be followed, for example, when an input indicating that the rule of the master device is to be followed is provided at the operating unit 40, with the function of the customization processing unit 101, the image forming apparatus 1 generates a customization confirmation screen for confirming the user that the rule information is to be updated, and causes this screen to be displayed by the operating unit 40 (step S150). When an input for approving the update of the rule information is provided to the customization confirmation screen, the image forming apparatus 1 receives the input (step S151) and, to search for the master device, broadcasts via the network 3 an inquiry message for inquiring about the master device, with the function of the communication controlling unit 102 (step S152). On the other hand, upon reception of the inquiry message with the function of the communication controlling unit 204 (step S153), the rule server 2 as the master device determines, with the function of the customization processing unit 203, whether the rule server 2 is the master device. Here, it is assumed that the rule server 2 is determined to be the master device. Upon determining that the rule server 2 itself is the master device, the rule server 2 transmits to the image forming apparatus 1 a response message indicating that the rule server 2 is the master device (step S154). Upon reception of the response message (step S155), the image forming apparatus 1 determines, with the function of the customization processing unit 101, that the rule information is obtained from the rule server 2 and, with the function of the communication controlling unit 102, transmits to the rule server 2 a request message for making a request for transmitting the rule information stored in the rule DB 206 (step S156). According to the request message, the rule server 2 reads the rule information stored in the rule DB 206, and then transmits the rule information to the image forming apparatus 1 (step S157). Upon reception of the rule information (step S158), with the function of the user-information managing unit 100, the image forming apparatus 1 stores the rule information in the rule DB 11 and updates the rule DB (step S159). In this manner, the image forming apparatus 1 applies the rule information of the rule server 2. The image forming apparatus 1 then causes a message indicating that the rule information has been updated to be displayed by the operating unit 40 (step S160).

With the configuration, in the image forming apparatus 1, the rule information of the master device can be applied. Therefore, the rule information can be applied in a unified manner among a plurality of device, or can be shared thereamong.

Here, at step S159, the rule information obtained from the master device is stored in the rule DB 111 of the image forming apparatus 1. At this time, the rule information stored in advance in the rule DB 111 may be updated by using the rule information obtained from the master device. Alternatively, the rule information stored in advance in the rule DB 111 and the rule information obtained from the master device may be distinguishably stored in the rule DB 111. For example, a master flag may be associated with the rule information obtained from the master device for storage in the rule DB 111, and the image forming apparatus 1 may refer to the master flag to validate one of these pieces of rule information and not validate the other according to a predetermined condition.

Also, the image forming apparatus 1 may be configured in advance not to have a rule DB. In this case, the rule information obtained at step S158 may be stored in any storage area of the external storage device of the image forming apparatus 1. Furthermore, after this rule information is stored in the storage area, the storage area may be set as a storage area of the rule DB.

Figure 20:
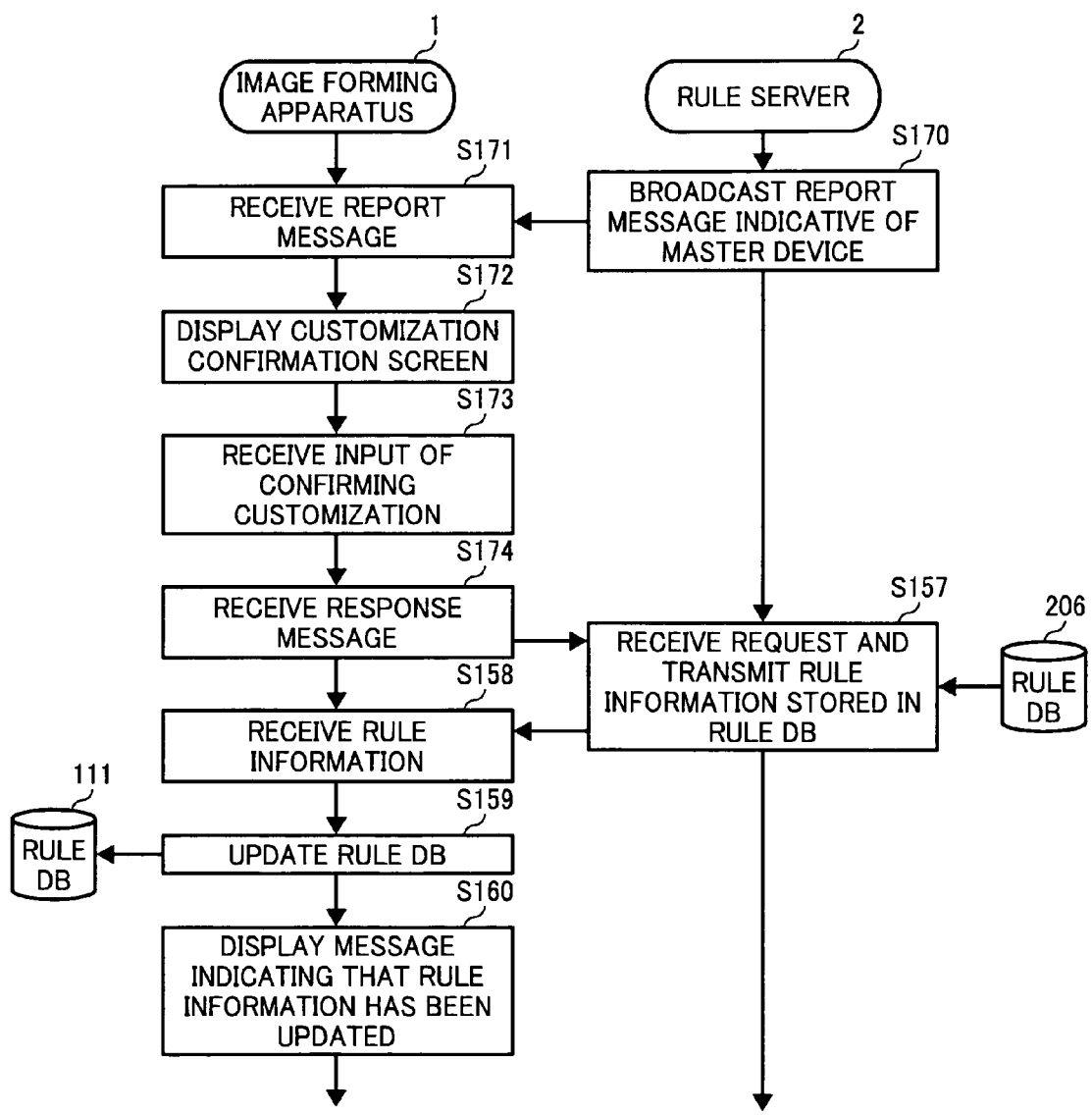
FIG. 20 is a flowchart of a customizing process in a modification of the second embodiment.

The configuration may be such that the master device declares that the device itself is the master device, instead of the image forming apparatus 1 inquiring of another external device about which is the master device. FIG. 20 is a flowchart of a customizing process in the present modification example. The rule server 2 as the master device determines, with the function of the customization processing unit 203, that the rule server 2 itself is the master device and, with the function of the communication controlling unit 204, broadcasts to external devices within a predetermined communication range in the network 3 a report message indicating that the rule server 2 is the master device (step S170). On the other hand, upon reception of the report message when being within the predetermined communication range (step S171), the image forming apparatus 1 generates, with the function of the customization processing unit 101, a customization confirmation screen for confirming the user that the rule information is to be updated, and causes the screen to be displayed by the operating unit 40 (step S172). When an input of approving the update of the rule information is provided to the customization confirmation screen, the image forming apparatus 1 receives the input (step S173) and, with the function of the customization processing unit 101, determines that the rule information is obtained from the rule server 2. Also, with the function of the communication controlling unit 102, the image forming apparatus 1 transmits to the rule server 2 a request message for making a request for transmitting the rule information stored in the rule DB 206 (step S174). The processes thereafter are similar to those at steps S157 to S160.

Figure 21:
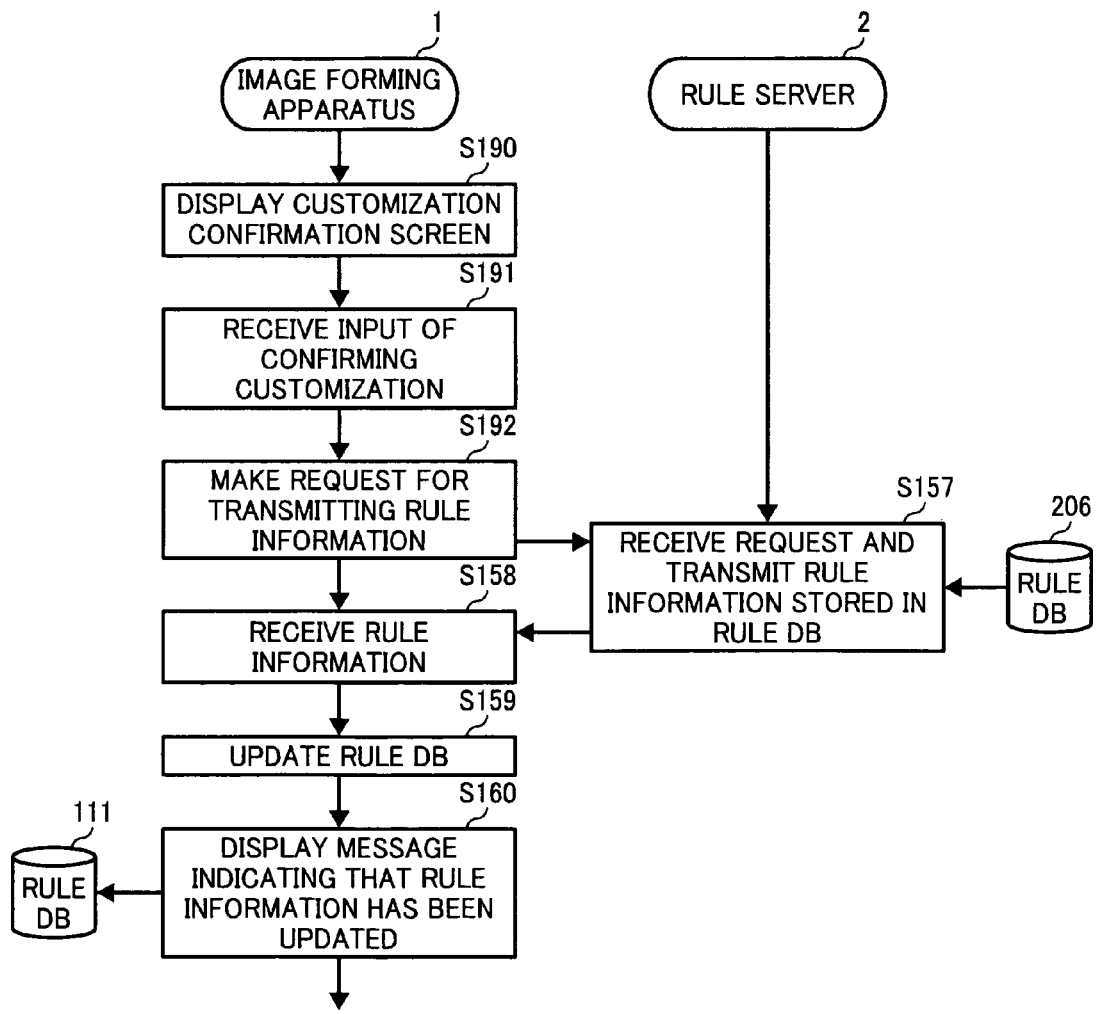
FIG. 21 is a flowchart of a customizing process in another modification of the second embodiment.

Also, the image forming apparatus 1 may be configured to have stored in advance in the HDD 13 or the like master specifying information that specifies the master device. The master specifying information is, for example, an Internet Protocol (IP) address of the master device. FIG. 21 is a flowchart of a customizing process in the present modification example. When entering a rule application area, the image forming apparatus 1 generates a customization confirmation screen for confirming the user that the rule information is to be updated, and causes the screen to be displayed by the operating unit 40 (step S190) In the customization confirmation screen, when an input of approving the update of the rule information is provided, the image forming apparatus 1 receives the input (step S191), obtains an IP address stored in advance in the HDD 13 or the like as master specifying information, and transmits to the master device corresponding to the IP address (here, the rule server 2) a request message for making a request for transmitting the rule information (step S192). Processes thereafter are similar to those at steps S157 to S160.

Here, the device settable as a master device is not restricted to the rule server 2, but may be the image forming apparatus 1 or another device or apparatus connected to the image forming apparatus 1, the information processing apparatus 5, the Web server 4, or the network 3. Also, the device settable as a slave device is not restricted to the image forming apparatus 1, but may be another device or apparatus connected to the rule server 2, the Web server 4, the information processing apparatus 5, or the network 3. Furthermore, the number of slave devices set for the master device is not restricted to one, but may be plural. Still further, the number of master devices set for the slave device is not restricted to one, but may be plural. In this case, priority may be further set to master devices. Still further, when the information processing apparatus 5 capable of mobile communication is set as a slave device, the time when the information processing apparatus 5 enters an application area where the rule of the master device is to be followed is the time when, for example, the information processing apparatus 5 is within a predetermined communication range. The predetermined communication range is, for example, a predetermined domain range in a network address. The information processing apparatus 5 may be configured to, for example, determine its own domain range and, according to the determination result, determine whether it has entered the application area where the rule of the master device is to be followed.

In the first embodiment, the image forming apparatus 1 is configured to apply the rule information stored in its own rule DB 111. However, this is not meant to be restrictive. Without applying the rule information stored in its own rule DB 111, the image forming apparatus 1 may obtain the rule information stored in another device or apparatus, such as the rule server 2, or an external storage device, and may apply the rule information. Furthermore, for example, when the image forming apparatus 1 does not have a rule DB, without applying the rule information stored in its own rule DB, the rule information stored in another device or apparatus, such as the rule server 2, or an external storage device may be obtained and applied.

Still further, the rule information may be shared among a plurality of apparatuses or device connected to the network 3. For example, when each device has its own unique rule information stored therein, rule information stored in one device may be shared, and other devices may obtain and apply the rule information stored in that device instead of applying its own stored rule information.

Still further, for example, when each device may not have a rule DB, may cause the rule information to be stored in a storage device, such as an SD card, and may share the rule information stored in that storage device. Still further, the rule information may be stored in a server device, such as a Web server, connected to the network 3, instead of a storage device, such as an SD card, and each device may share the rule information stored in the server device.

Still further, in the second embodiment, in the information processing apparatus 5 set as a slave device, the rule information of the master device may be obtained and applied, irrespectively of whether the rule DB is included in the apparatus.

Still further, among the devices connected to the network 3, the rule information may not be shared with other devices, but rule information uniquely included in each device may be applied.

Figure 22:
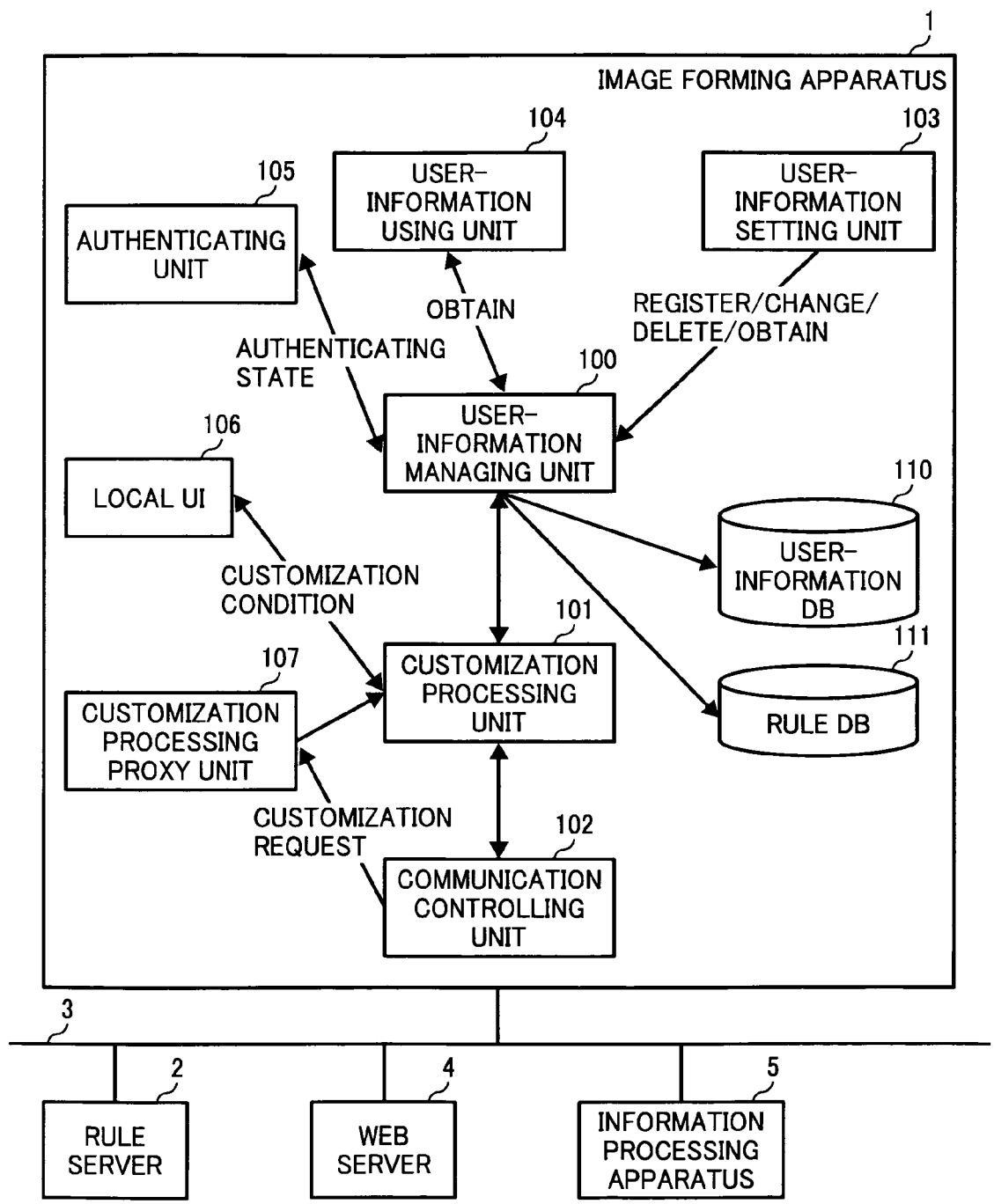
FIG. 22 is a block diagram of an image forming apparatus according to a third embodiment of the present invention.
Figure 23:
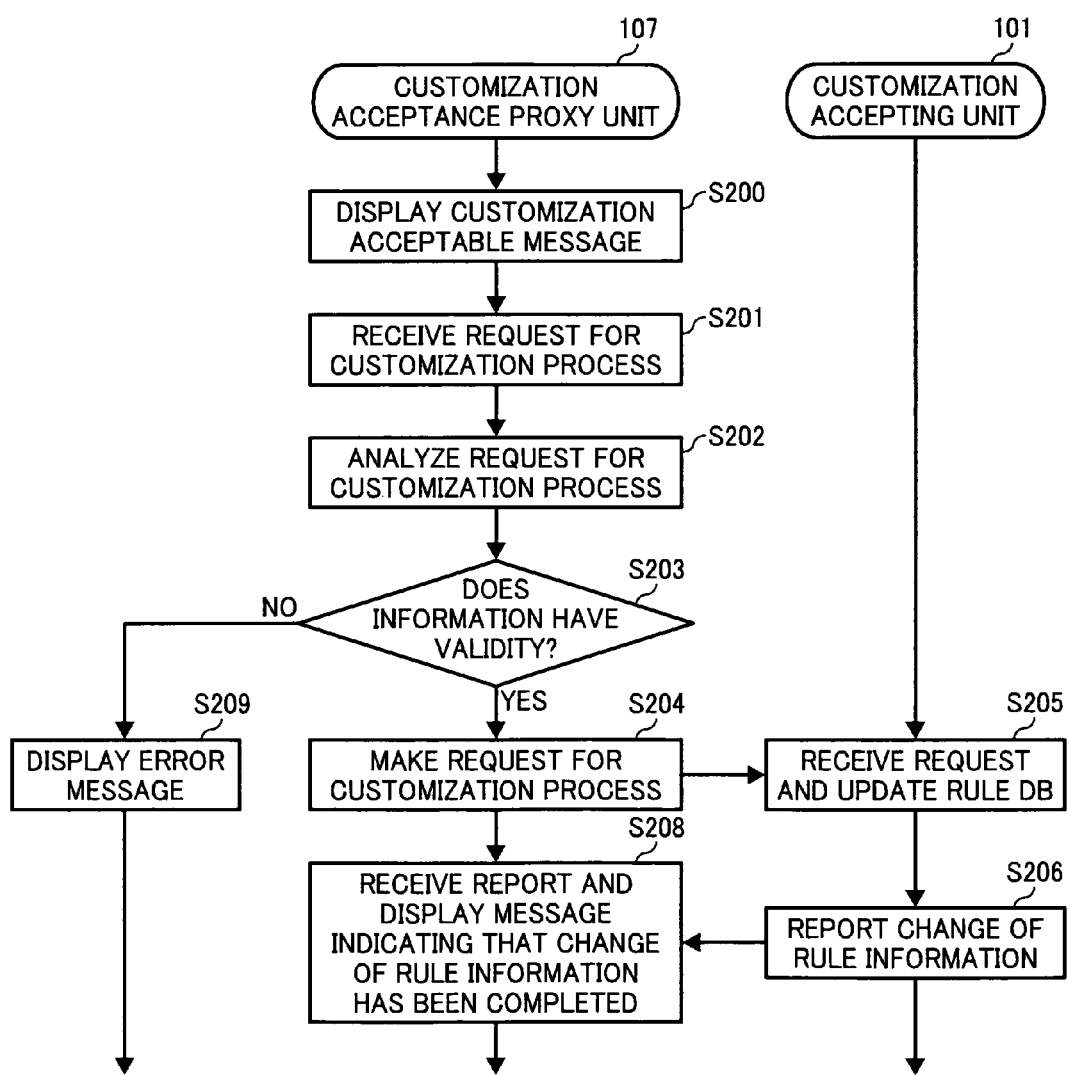
FIG. 23 is a flowchart of a customizing process performed via a customization processing proxy unit shown in FIG. 22.

In each of the first and second embodiments, the rule information is obtained through data communication. However, this is not meant to be restrictive. For example, the rule information may be obtained by using a barcode, a special pattern, or encrypted data. Specifically, for example, specifying information, such as a storage location of the rule information and a procedure for obtaining the rule information, is coded and recorded on a paper medium as a barcode or a special pattern. Alternatively, the barcode or the special pattern is handled as electronic data. FIG. 22 is a block diagram of an image forming apparatus 1 that can obtain such rule information. As depicted in the drawing, the image forming apparatus 1 has the customization processing proxy unit 107. The customization processing proxy unit 107 reads and analyzes the barcode or special pattern to obtain the specifying information. FIG. 23 is a flowchart of a customizing process performed via the customization processing proxy unit 107. The customization processing proxy unit 107 causes a message indicating that the rule information can be customized to be displayed by the operating unit 40 (step S200). When the user referring to the message provides an input for making a request for customizing the rule information, the customization processing proxy unit 107 receives the request (step S201), and reads and analyzes a barcode or special pattern (step S202). When obtaining, as a result of analysis, the specifying information and determining that the specifying information has validity ("YES" at step S203), the customization processing proxy unit 107 requests the customization processing unit 101 to obtain the rule information by using the specifying information and customize the rule information (step S204). Upon receiving the request, the customization processing unit 101 changes the rule information stored in the rule DB 111 to update the rule DB 206 (step S205). The customization processing unit 101 then reports to the customization processing proxy unit 107 that the rule information has been changed (step S206). Upon reception of the report, the customization processing proxy unit 107 causes a message indicating that the change of the rule information has ended to be displayed by the operating unit 40 (step S208). Here, if the determination result at step S203 is negative, the customization processing proxy unit 107 causes an error message to be displayed by the operating unit 40 (step S209).

Also, the rule information may be once captured into a portable information device, and then applied to a device or apparatus, such as the image forming apparatus 1. For example, the rule information may be stored in an RFID tag, and the rule information stored in the RFID tag may be obtained via an RFID reader/writer. Furthermore, the rule information may be obtained by recording on a paper medium the rule information represented by characters and the like and then reading the rule information by a reading unit, such as a scanner, for analysis. Still further, the rule information may be obtained by receiving and analyzing FAX or electronic mail having the rule information written as characters. Still further, the rule information may be obtained by obtaining and analyzing, via an audio input device, audio information representing the rule information by voice. Still further, not only the rule information itself, but a user operation input, such as a request for customization, may be obtained via audio, FAX, or electronic mail.

Still further, the configuration may be applied not restrictively to the image forming apparatus 1 but also to the information processing apparatus 5, the Web server 4, and the rule server 2.

In each of the embodiments, the specification information and the rule information may be encrypted and transmitted to another device. With such a configuration, for example, the rule information and the specification information indicative of a storage location of the rule information can be securely transmitted to another device.

In each of the embodiments, the user-information DB 110 and the rule DB 111 of the image forming apparatus 1 are stored in the HDD 13. This is not meant to be restrictive, and these DB may be stored in another storage medium, such as flash memory.

According to an aspect of the present invention, specification information indicative of specifications of user information is stored, and the specification information can be changed according to an operation input of a user. Therefore, according to the environment where the user information is used, the specifications of the user information can be dynamically changed. Therefore, time and cost required for changing the specification of the user information can be reduced. Also, user convenience can be improved.

According to another aspect of the present invention, the specification information can be obtained from a second information processing apparatus or a storage medium that stores the specification information. Therefore, according to the environment where the user information is used, the specifications of the user information can be more effectively changed.

Also, according to still another aspect of the present invention, the specification information is obtained from a reference information processing apparatus set in advance. With this, the specification information can be used among a plurality of devices in a unified manner, or can be shared thereamong.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
an input unit that receives operation input from a user;
a user-information storage unit that stores therein user information;
a specification-information storage unit that stores therein a plurality of attributes for the user and specification information indicative of specifications of the user information stored in the user-information storage unit;
a changing unit that, when the operation input is a request for changing the specification information, changes the specification information stored in the specification-information storage unit;
a receiving unit that receives a request for changing the user information stored in the user-information storage unit;
a determining unit that determines, based on the specification information changed by the changing unit, whether or not the user information can be changed; and
an updating unit that updates the user information when the determining unit determines that the user information can be changed; wherein
each attribute of the plurality of attributes is governed by an attribute rule, and
the attribute rule of said each attribute determines that the specification information can be changed when the attribute rule of said each attribute to be changed complies with an attribute rule of said attribute stored in the specification -information storage unit, the attribute rule being a set of items.

2. The information processing apparatus according to claim 1, further comprising a specification obtaining unit that obtains, from a second information processing apparatus that stores therein second specification information indicative of specifications of the user information, the second specification information via a network, wherein
the changing unit causes the second specification information obtained by the specification obtaining unit to be stored in the specification-information storage unit.

3. The information processing apparatus according to claim 2, wherein the changing unit writes the second specification information on the specification information already present in the specification-information storage unit thereby changing the specification information present in the specification -information storage unit.

4. The information processing apparatus according to claim 2, wherein when the operation input is a request for obtaining the second specification information, the specification obtaining unit obtains the second specification information from the second information processing apparatus.

5. The information processing apparatus according to claim 2, wherein a reference information processing apparatus to which the information processing apparatus is subordinate is set in advance, the reference information processing apparatus storing therein third specification information indicative of specifications of the user information, and
the specification obtaining unit includes
an inquiring unit that transmits inquiry information for inquiring, when the input unit receives an input of a request for obtaining the third specification information, which apparatus is the reference information processing apparatus, via the network according to the input;
a response receiving unit that receives response information transmitted from the reference information processing apparatus that responds to the inquiry information transmitted by the inquiring unit; and
a third obtaining unit that obtains the third specification information from the reference information processing apparatus based on the response information received by the response receiving unit, and
the changing unit causes the third specification information obtained by the third obtaining unit to be stored in the specification-information storage unit.

6. The information processing apparatus according to claim 2, wherein a reference information processing apparatus to which the information processing apparatus is subordinate is set in advance, the reference information processing apparatus storing therein third specification information indicative of specifications of the user information, and
the specification obtaining unit includes
a statement receiving unit that receives statement information indicative of the reference information processing apparatus from the reference information processing apparatus via the network; and
a third obtaining unit that obtains the third specification information from the reference information processing apparatus based on the statement information received by the statement receiving unit, and
the changing unit causes the third specification information obtained by the third obtaining unit to be stored in the specification-information storage unit.

7. The information processing apparatus according to claim 2, wherein the specification obtaining unit includes
a specifying-information storage unit that stores therein specifying information that specifies a reference information processing apparatus to which the information processing apparatus is subordinate, the reference information processing apparatus storing third specification information indicative of specifications of the user information; and
a third obtaining unit that obtains the third specification information from the reference information processing apparatus based on the specifying information stored in the specific-information storage unit, and
the changing unit causes the third specification information obtained by the third obtaining unit to be stored in the specification-information storage unit.

8. The information processing apparatus according to claim 1, further comprising a specification obtaining unit that obtains, from a storage medium that stores therein second specification information indicative of specifications of the user information, the second specification information via wireless communication or wired communication, wherein
the changing unit causes the second specification information obtained by the specification obtaining unit to be stored in the specification-information storage unit.

9. The information processing apparatus according to claim 1, further comprising:
a specific-information obtaining unit that obtains specification specifying information that specifies specifications of the user information; and
a specification obtaining unit that obtains the specification information by using the specification specifying information obtained by the specific obtaining unit, wherein
the changing unit causes the specification information obtained by the specification obtaining unit to be stored in the specification-information storage unit.

10. The information processing apparatus according to claim 1, further comprising:
a record obtaining unit that obtains record information that is a record of specification information indicative of specifications of the user information; and
a specification obtaining unit that obtains the specification information by using the record information obtained by the record obtaining unit.

11. The information processing apparatus according to claim 1, further comprising a request receiving unit that receives, via the network, request information for making a request for changing the specification information, wherein
when the request receiving unit receives the request information, the changing unit changes the specification information stored in the specification -information storage unit according to the request information.

12. The information processing apparatus according to claim 1, further comprising a second changing unit that changes, when the operation input is a request for changing the user information, the user information stored in the user-information storage unit.

13. The information processing apparatus according to claim 12, wherein when the operation input is a request for changing the user information, the second changing unit uses the specification information stored in the specification-information storage unit and determines whether changing the user information is appropriate for the specifications indicated by the specification information and, if the determination result is positive, changes the user information stored in the user-information storage unit.

14. An information processing apparatus comprising:
an input unit that receives operation input from a user;
a user-information storage unit that stores therein user information;
a specification obtaining unit that obtains specification information from at least one of a second information processing apparatus and a storage medium that store therein the specification information indicative of specifications of the user information stored in the user-information storage unit;
a specification-information storage unit that stores a plurality of attributes for each user and the specification information obtained by the specification obtaining unit;
a changing unit that, when the operation input is a request for changing the specification information, changes the specification information stored in the specification-information storage unit;
a receiving unit that receives a request for changing the user information stored in the user-information storage unit;
a determining unit that determines, based on the specification information changed by the changing unit, whether or not the user information can be changed; and
an updating unit that updates the user information when the determining unit determines that the user information can be changed; wherein
each attribute of the plurality of attributes is governed by an attribute rule, and
the attribute rule of said each attribute determines that the specification information can be changed when the attribute rule of said each attribute to be changed complies with an attribute rule of said attribute stored in the specification -information storage unit, the attribute rule being a set of items.

15. An information processing method comprising:
receiving operation input from a user;
changing, when the operation input is a request for changing the specification information stored in a specification-information storage unit, the specification information indicative of specifications of the user information, the specification information stored in the specification-information storage unit;
storing a plurality of attributes for each user;
receiving a request for changing the user information stored in a user-information storage unit;
determining, based on the changed specification information, whether or not the user information can be changed; and
updating the user information when the determining step determines that the user information can be changed; wherein
each attribute of the plurality of attributes is governed by an attribute rule, and
the attribute rule of said each attribute determines that the specification information can be changed when the attribute rule of said each attribute to be changed complies with an attribute rule of said attribute stored in the specification -information storage unit, the attribute rule being a set of items.

* * * * *